(12) United States Patent
Watanabe et al.

(10) Patent No.: US 9,384,536 B2
(45) Date of Patent: Jul. 5, 2016

(54) IMAGE FILE GENERATION DEVICE AND IMAGE FILE DISPLAY DEVICE

(71) Applicant: FUJIFILM Corporation, Tokyo (JP)

(72) Inventors: Mikio Watanabe, Saitama (JP); Masaya Tamaru, Saitama (JP)

(73) Assignee: FUJIFILM CORPORATION, Tokyo (JP)

( * ) Notice: Subject to any disclaimer, the term of this patent is extended or adjusted under 35 U.S.C. 154(b) by 0 days.

(21) Appl. No.: 14/602,507

(22) Filed: Jan. 22, 2015

(65) Prior Publication Data
US 2015/0130828 A1    May 14, 2015

Related U.S. Application Data

(63) Continuation of application No. PCT/JP2013/070296, filed on Jul. 26, 2013.

(30) Foreign Application Priority Data

Aug. 16, 2012  (JP) .................................. 2012-180523

(51) Int. Cl.
*G09G 5/02*   (2006.01)
*G06T 5/00*   (2006.01)
(Continued)

(52) U.S. Cl.
CPC  *G06T 5/009* (2013.01); *G09G 3/36* (2013.01); *G09G 5/10* (2013.01); *H04N 1/3871* (2013.01); *H04N 1/4072* (2013.01); *H04N 5/235* (2013.01); *H04N 5/23245* (2013.01); *H04N 5/357* (2013.01); *G09G 2320/0238* (2013.01);
(Continued)

(58) Field of Classification Search
None
See application file for complete search history.

(56) References Cited

U.S. PATENT DOCUMENTS

2001/0008449 A1    7/2001  Okada et al.
2005/0083274 A1*   4/2005  Beddes ................ G09G 3/2014
                                                              345/82

(Continued)

FOREIGN PATENT DOCUMENTS

JP    2001-203970 A    7/2001
JP    2004-7301 A      1/2004
(Continued)

OTHER PUBLICATIONS

International Search Report, issued in PCT/JP2013/070296, dated Oct. 22, 2013.
(Continued)

*Primary Examiner* — Anh-Tuan V Nguyen
(74) *Attorney, Agent, or Firm* — Birch, Stewart, Kolasch & Birch, LLP

(57) ABSTRACT

An image file generation device comprises a first image data acquisition device that acquires N-bit first image data, a second image data generation device that generates M (M<N)-bit second image data, a third image data generation device that selects low brightness pixels with a predetermined brightness level from among respective pixels of the first image data to generate third image data with the number of gradations more than the number of gradations assigned to pixel values equal to or less than the brightness level of the second image data, on the basis of the low brightness pixels, and an image file generation device that generates an image file in which the second image data, the third image data, and brightness level information showing the brightness level used for generating the third image data, are associated with each other.

11 Claims, 34 Drawing Sheets

(51) Int. Cl.
*G09G 3/36* (2006.01)
*H04N 1/387* (2006.01)
*H04N 1/407* (2006.01)
*G09G 5/10* (2006.01)
*H04N 5/357* (2011.01)
*H04N 5/232* (2006.01)
*H04N 5/235* (2006.01)
*H04N 5/202* (2006.01)

(52) U.S. Cl.
CPC .............. *G09G2320/0271* (2013.01); *G09G 2320/0276* (2013.01); *G09G 2320/0646* (2013.01); *G09G 2340/02* (2013.01); *G09G 2340/0428* (2013.01); *G09G 2360/16* (2013.01); *H04N 5/202* (2013.01)

(56) References Cited

U.S. PATENT DOCUMENTS

| | | | | |
|---|---|---|---|---|
| 2005/0195291 A1* | 9/2005 | Kubo | .................... | G03B 7/093 348/229.1 |
| 2005/0212955 A1* | 9/2005 | Craig | .................... | H04N 5/232 348/362 |
| 2006/0055785 A1 | 3/2006 | Nagajima | | |
| 2006/0233446 A1* | 10/2006 | Saito | .................... | H04N 19/176 382/232 |
| 2006/0239674 A1* | 10/2006 | Manson | ................. | G03B 17/18 396/281 |
| 2007/0115372 A1* | 5/2007 | Wu | .................... | H04N 5/2351 348/230.1 |
| 2007/0165120 A1* | 7/2007 | Takane | ................ | H04N 5/2351 348/248 |
| 2007/0177050 A1* | 8/2007 | Xiao | .................... | G03B 7/091 348/371 |
| 2008/0298707 A1 | 12/2008 | Kubo et al. | | |
| 2009/0066819 A1* | 3/2009 | Ando | .................... | G06T 5/009 348/254 |
| 2009/0110073 A1* | 4/2009 | Wu | .................... | H04N 7/50 375/240.15 |
| 2010/0026825 A1* | 2/2010 | Doida | .................... | G06T 3/40 348/222.1 |
| 2010/0225677 A1* | 9/2010 | Shingai | ................ | G09G 3/3629 345/690 |
| 2010/0303346 A1* | 12/2010 | Suito | .................... | H04N 1/407 382/163 |
| 2011/0007188 A1* | 1/2011 | Manabe | ................. | G06T 5/009 348/240.2 |
| 2011/0176733 A1* | 7/2011 | Ch Ien | ................. | G06K 9/342 382/195 |
| 2011/0249135 A1* | 10/2011 | Minato | .............. | H04N 5/23232 348/222.1 |
| 2012/0050578 A1* | 3/2012 | Aoki | .................... | G03B 17/14 348/240.2 |
| 2013/0088429 A1* | 4/2013 | Yang | .................... | G06F 1/3231 345/158 |
| 2013/0148029 A1* | 6/2013 | Gish | .................... | G09G 5/02 348/708 |

FOREIGN PATENT DOCUMENTS

| | | |
|---|---|---|
| JP | 2006-115475 A | 4/2006 |
| JP | 2008-301010 A | 12/2008 |
| JP | 2009-296210 A | 12/2009 |
| JP | 2010-278889 A | 12/2010 |
| JP | 2011-250464 A | 12/2011 |

OTHER PUBLICATIONS

Kodak Corp., "DCS Pro SLR/n Digital Camera DCS technology", Dec. 26, 2014, the internet (http://wwwjp.kodak.com/JP/ja/professional/products/cameras/dcsproslr/eri_jpeg.shtml), p. 1/1.

Written Opinion of the International Searching Authority, issued in PCT/JP2013/070296, dated Oct. 22, 2013.

* cited by examiner

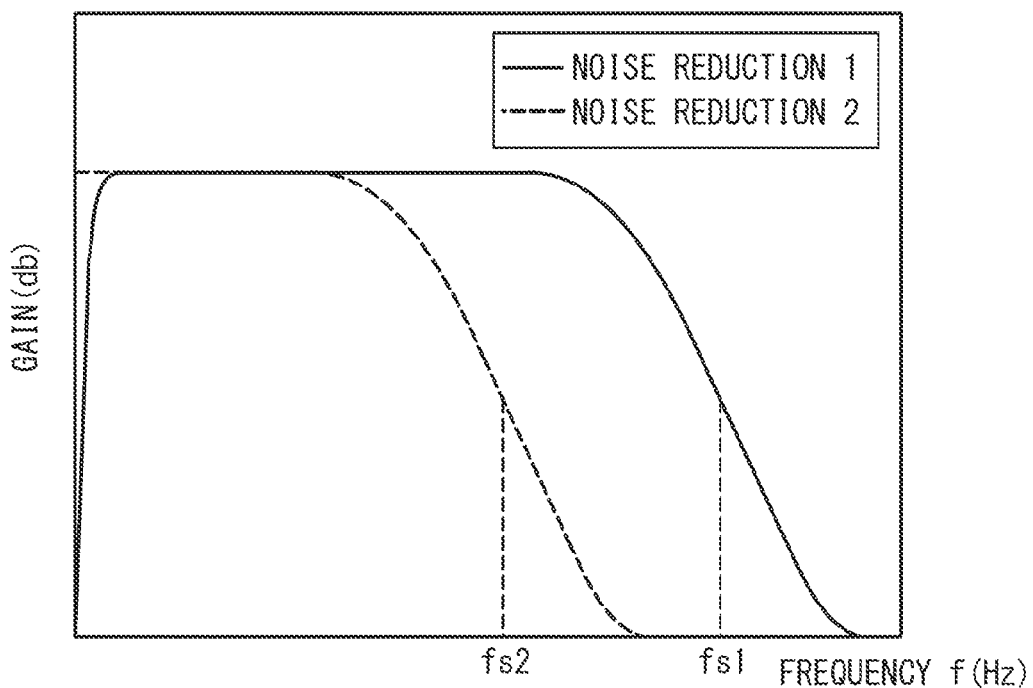

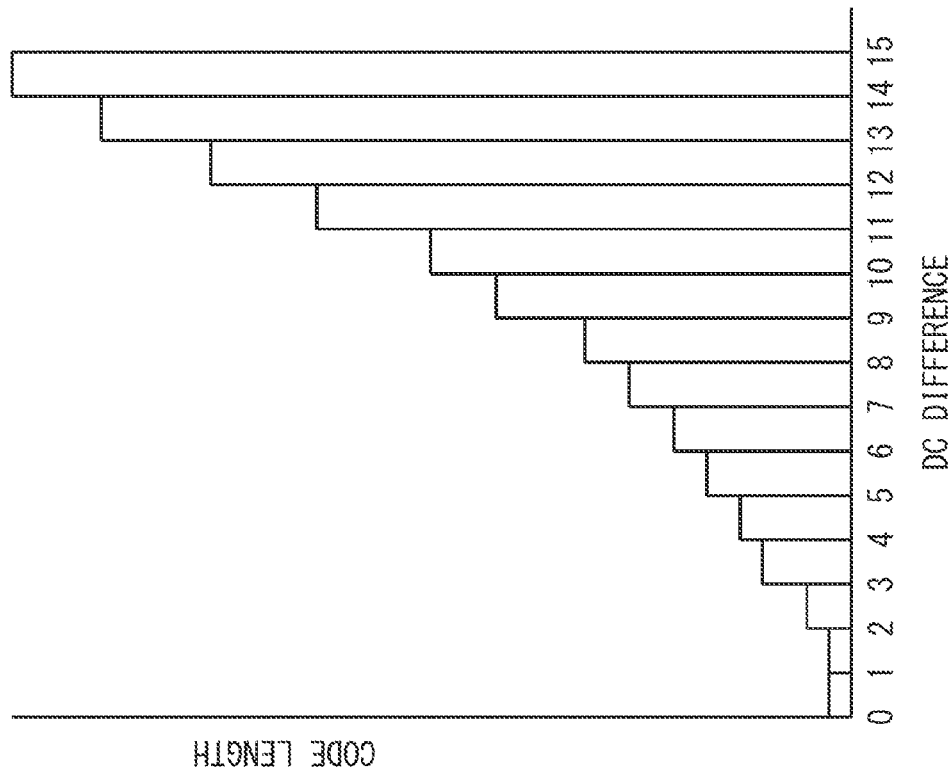
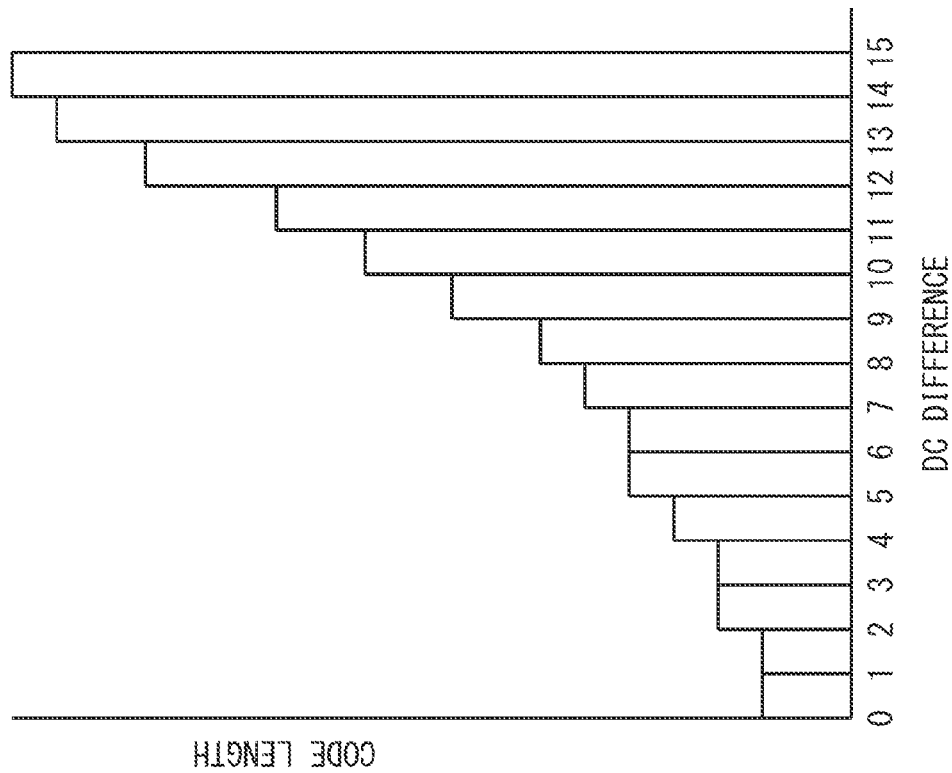

(A) RAW DATA D   | 0 | 1 | 2 | 3 | 4 | 5 | 6 | 7 | 8 | 9 | 10 | 11 | 12 | 13 |

(B) BODY IMAGE DATA DHD   | 0 | 1 | 2 | 3 | 4 | 5 | 6 | 7 |
←Bls (C) DHD (m, i) × Rb(m)   | 0 | 1 | 2 | 3 | 4 | 5 | 6 | 7 |
    [Rb(m)=4]
    USE AS DD →

IMAGE FILE GENERATION DEVICE AND IMAGE FILE DISPLAY DEVICE

CROSS-REFERENCE TO RELATED APPLICATIONS

This application is a Continuation of PCT International Application No. PCT/JP2013/070296 filed on Jul. 26, 2013, which claims priority under 35 U.S.C §119(a) to Japanese Patent Application No. 2012-180523 filed on Aug. 16, 2012. Each of the above application(s) is hereby expressly incorporated by reference, in its entirety, into the present application.

BACKGROUND OF THE INVENTION

1. Field of the Invention

The present invention relates to an image file generation device that generates an image file for recording from multi-gradation image data, and an image file display device that displays the image file.

2. Description of the Related Art

There are a portable terminal such as a digital camera and a smartphone, a TV, and various monitors, each of which is provided with a liquid crystal display device as an image display device in many cases. The liquid crystal display device includes a liquid crystal panel in which liquid crystal elements with adjustable light transmittance are arranged to form a two-dimensional array, and a backlight (device) that irradiates the liquid crystal panel with light.

In recent years, there has been known a liquid crystal display device that includes a plurality of illumination sections capable of individually illuminating each of a plurality of areas formed by dividing a display area of a liquid crystal panel, and that performs local dimming control (or area control) to independently control brightness of each of the illumination sections. The local dimming control is performed to increase contrast feeling in a case where an image locally includes an area with low brightness and an area with high brightness, thereby enabling capability of reproducing gradation in an area with particularly low brightness (hereinafter referred to as a shadow portion) to be improved.

In a case where data of an image photographed with a digital camera is displayed on a liquid crystal display device that performs the local dimming control above (hereinafter referred to as simply a liquid crystal display device), a conventional digital camera records photographed image data at 8-bit, so that the number of gradations of photographed image data in a shadow portion is not enough. Thus, there has been a problem in which it is impossible to take advantage of performance of a liquid crystal display device with a wide dynamic range cannot be taken, so that even a liquid crystal display device with improved capability of reproducing gradation (such as 10-bit) has the same image quality of a photographed image to be displayed as image quality of a conventional liquid crystal display device.

In a digital camera described in Japanese Patent Application Laid-Open No. 2011-250464 (hereinafter referred to as PTL 1), photographed image data is recorded in a plurality of formats such as a RAW (non-compression recording format) and a JPEG (compression recording format). The RAW data ensures the sufficient number of gradations in a shadow portion, so that it is possible to display the shadow portion of the photographed image at sufficient gradation on the basis of the RAW data.

In an image processing apparatus described in Japanese Patent Application Laid-Open No. 2008-301010 (hereinafter referred to as PTL 2), in order to display 8-bit input image data in a liquid crystal display device capable of 10-bit gradation display, $\alpha$-bit expansion is applied to input image data, and then data smoothing is applied to the input image data. Accordingly, it is possible to increase the number of effective gradations of the 8-bit input image data.

In an image recording method described in "KODAK PROFESSIONAL DCS Pro SLR_n ERI-JPEG" (hereinafter referred to as NPL 1), difference data between 12-bit RAW data and 8-bit JPEG image data is acquired so that the JPEG image data and the difference data are recorded in the same image file. Since image data equivalent to the RAW data can be acquired from the JPEG image data and the difference data, it is possible to display a shadow portion at sufficient gradation.

An image recorder described in Japanese Patent Application Laid-Open No. 2001-203970 (hereinafter referred to as PTL 3) performs steps of: converting 14-bit gradation information (image data) into 8-bit gradation information; and converting the 14-bit gradation information into 12-bit gradation information with conversion characteristics in which reproducing characteristics on a low brightness side is emphasized. Next, the image recorder performs steps of: acquiring difference information between the 12-bit gradation information and the 8-bit gradation information described above; and associating the 8-bit gradation information and the difference information with each other so that the information is stored. Accordingly, since 12-bit gradation information can be generated on the basis of the 8-bit gradation information and the difference information, it is possible to display a shadow portion at sufficient gradation.

In an image processing apparatus described in Japanese Patent Application Laid-Open No. 2010-278889 (hereinafter referred to as PTL 4), after a parameter is set to divide input image data into a dark image area and a light image area, if a bit number of the input image data is more than a predetermined quantization bit number, a density map is generated in accordance with the parameter above to show which of the dark image area and the light image area each of pixels in the input image data belongs to. Subsequently, the image processing apparatus quantizes each of the pixels at a quantization bit number corresponding to an area to which each of the pixels belongs, on the basis of the density map and the quantization bit number, described above, to generate quantization data on the basis of each of the quantized pixels. Accordingly, since it is possible to favorably hold data of a shadow portion to be lost at the time of conventional encoding, the shadow portion can be displayed at sufficient gradation in a liquid crystal display device.

SUMMARY OF THE INVENTION

Although the digital camera described in PTL 1 records RAW data, the RAW data includes data arrangement and characteristics that are different for each of types of imaging elements. Thus, the RAW data is incompatible due to a data format that is different for each of types of imaging elements, so that a user has to designate a parameter at the time of reproducing an image, thereby causing a problem in which an operation is complicated. In addition, there is a problem in which the RAW data causes an increase in the amount of data.

Although the image processing apparatus described in PTL 2 applies the $\alpha$-bit expansion to 8-bit input image data, the original of the input image data has only data in 8-bit, so that image data in the $\alpha$-bit expansion cannot acquire resolution. As a result, there is a possibility that a shadow portion is not displayed at sufficient gradation.

In the image recording method described in NPL 1, JPEG image data and difference data are recorded in the same image file. Unfortunately, all differences (difference data) from RAW data are recorded to cause a problem in which the amount of recording data increases.

Although the image recorder described in PTL 3 stores 8-bit gradation information (image data) and difference information by associating them with each other, reversible compression or reversible compression at low compression is required to be applied to the difference information to restore 12-bit gradation information. Since the difference information has lower correlation between data items adjacent to each other as compared with original gradation information (14-bit gradation information), the difference information has data capacity that is several times more than data capacity of usual 8-bit gradation information. Thus, in a method described in PTL 3, there is included the amount of data equivalent to or more than the amount of data in which image data in 12-bit range is recorded with non-compression. As a result, the method is not suitable for storage, transmission, transport, and the like of data.

The image processing apparatus described in PTL 4 quantizes each of pixels at a quantization bit number corresponding to an area to which each of the pixels belongs (a dark image area and a light image area). Unfortunately, since image data is recorded at a quantization bit number different for each of the pixels, there is a problem in which the image data cannot be reproduced by a normal display device premised on quantization at a single quantization bit number to cause the recorded data to be incompatible.

It is an object of the present invention to provide an image file generation device capable of creating an image file with which a shadow portion at sufficient gradation can be displayed without remarkably increasing the amount of recorded data, and an image file display device capable of displaying the image file.

An image file generation device that achieves the object of the present invention includes: a first image data acquisition device that acquires N-bit first image data; a second image data generation device that generates M (M<N)-bit second image data from the first image data acquired by the first image data acquisition device; a third image data generation device that selects low brightness pixels with a predetermined brightness level from among respective pixels of the first image data acquired by the first image data acquisition device to generate third image data with the number of gradations more than the number of gradations assigned to pixel values equal to or less than a brightness level of the second image data, on the basis of the low brightness pixels; and an image file generation device that generates an image file in which the second image data generated by the second image data generation device, the third image data generated by the third image data generation device, and brightness level information showing the brightness level used for generating the third image data, are associated with each other.

According to the present invention, it is possible to use the third image data in which the amount of recorded data is reduced in a low brightness portion (shadow portion) where brightness is equal to or less that of the brightness level.

The second image data generation device applies first signal processing to the first image data, and the third image data generation device applies second signal processing to the third image data. Each of the first signal processing and the second signal processing includes γ-correction processing, noise reduction processing, sharpness processing, and compression processing. In addition, it is preferable that the first signal processing and the second signal processing are different in characteristics of at least any one of respective processing steps. Accordingly, it is possible to make an image of the third image data better than an image of the second image data, and to reduce the amount of record of the third image data.

It is preferable that the third image data generation device counts a pixel number of the low brightness pixels to generate the third image data if the pixel number is more than a predetermined threshold value. Accordingly, unnecessary third image data in which a ratio of low brightness portions is low is prevented from being recorded.

It is preferable that the first image data acquisition device includes a photographing section that photographs a subject and generates the first image data.

It is preferable that the photographing section has a plurality of types of photographing modes, and includes a photographing mode selection device that selects a photographing mode, and preferable that the third image data generation device generates the third image data in a case where a specific photographing mode is selected by the photographing mode selection device. Accordingly, in a case where an effect of a multi-gradation display in a low brightness portion becomes remarkable, the third image data can be recorded, and also unnecessary third image data in which a ratio of low brightness portions is low is prevented from being recorded.

It is preferable that the photographing section includes a setting device that sets a photographing setting value that shows a condition of photographing a subject, and the third image data generation device generates the third image data in a case where the photographing setting value set by the setting device is within a predetermined range. Accordingly, in a case where an effect of a multi-gradation display in a low brightness portion becomes remarkable, the third image data can be recorded, and also unnecessary third image data in which a ratio of low brightness portions is low is prevented from being recorded.

It is preferable to include a pixel value statistic amount calculation device that calculates a statistic amount of a pixel value of each of pixels of the first image data acquired by the first image data acquisition device, and a brightness level determination device for determining a brightness level at which pixels in a predetermined ratio can be selected as the low brightness pixel on the basis of the statistic amount calculated by the pixel value statistic amount calculation device, in first image data, and preferable that the third image data generation device selects a low brightness pixel on the basis of the brightness level determined by the brightness level determination device. Accordingly, it is possible to generate the third image data corresponding to brightness of low brightness portions included in the first image data and a ratio (frequency) thereof.

It is preferable that the low brightness pixels are pixels of lower-order M bits of the first image data, and the third image data generation device generates the third image data in the M-bit.

An image file display device that achieves the object of the present invention includes: an image file acquisition device that acquires an image file generated by the image file generation device described above; a display device provided with a screen capable of Q (Q>M)-bit gradation display; and a display control device that outputs display data generated on the basis of the image file acquired by the image file acquisition device to the display device to allow the display device to display a display image on the screen, the display control device generating display data corresponding to a normal brightness portion where brightness in the display image is more than the brightness level, from the second image data, and display data corresponding to a low brightness portion where brightness in the display image is equal to or less than the brightness level from, the third image data.

According to the present invention, it is possible to generate the display data corresponding to the low brightness portion of the display image, from the third image data.

It is preferable that the display device includes: a liquid crystal panel; a plurality of illumination sections that individually illuminate a respective plurality of segments into which a screen of the liquid crystal panel is divided; and a backlight capable of individually controlling brightness of the plurality of illumination sections, and preferable to include a light emission rate determination device that determines a light emission rate of each of the illumination sections corresponding to the respective segments on the basis of the second image data, and a backlight control device that individually calculates and controls brightness of the illumination sections on the basis of the second image data and the light emission rate determined by the light emission rate determination device, and preferable that, in a case where a bit number of the brightness level is B (B is a natural number 1 or more), and brightness of the illumination sections is controlled so as to be $\frac{1}{2}^P$ (P is a natural number 0 or more) times maximum brightness, the display control device generates multiplication data by multiplying the third image data by $2^P$ to select a higher-order (B+P) bit of the multiplication data as the display data corresponding to the low brightness portion. Accordingly, it is possible to perform multi-gradation display of the low brightness portion of the display image.

It is preferable that the light emission rate determination device acquires a representative value of pixel values of the second image data for each of the segments on the basis of the second image data to determine the light emission rate on the basis of the respective representative value of each of the segments. Accordingly, it is possible to determine an appropriate light emission rate for each of segments. In a case where the representative value is a peak value of the pixel values of the segments, for example, brightness of the illumination section can be reduced in a segment in which the peak value is relatively small, so that power can be saved.

An image file display device that achieves the object of the present invention includes: an image file acquisition device that acquires an image file generated by the image file generation device; a display device provided with a screen capable of Q (Q>M)-bit gradation display; a gradation information acquisition device that acquires gradation information of the display device; and a display control device that outputs display data generated on the basis of the image file acquired by the image file acquisition device to the display device to allow the display device to display a display image on the screen, the display control device generating Q-bit display data by using the second image data and (Q−M)-bit equal to or less than a higher-order (B+1)-bit of the third image data, on the basis of the gradation information acquired by the gradation information acquisition device, in a case where a bit number of the brightness level is B (B is a natural number 1 or more).

According to the present invention, it is possible to generate the display data corresponding to the low brightness portion of the display image, from the third image data.

The image file generation device of the present invention generates an image file in which the M (M<N)-bit second image data generated from the N-bit first image data, the third image data generated on the basis of low brightness pixels at a predetermined brightness level in respective pixels of the first image data, and brightness level information, are associated with each other. Thus, it is possible to display a low brightness portion (shadow portion) in a display image at sufficient gradation, on the basis of the image file. In addition, only the second image data and the third image data are recorded, so that the amount of recorded data does not remarkably increase. Further, the second image data can be generated and recorded by a standard recording method, so that compatibility is secured.

The image file display device of the present invention generates display data corresponding to low brightness portions of a display image from the third image data, on the basis of the image file generated by the image file generation device, so that it is possible to display the low brightness portions at sufficient gradation.

BRIEF DESCRIPTION OF THE DRAWINGS

FIG. 6 is an illustration for describing characteristics of a noise reduction filter used in first and second noise reduction circuits.

FIG. 7 is an illustration for describing shadow image data.

FIG. 8A is an illustration for describing a Huffman code used for compression of body image data and shadow image data.

FIG. 8B is an illustration for describing the Huffman code used for compression of body image data and shadow image data.

DETAILED DESCRIPTION OF THE PREFERRED EMBODIMENTS

Configuration of the First Embodiment (Digital Camera)

Figure 1:
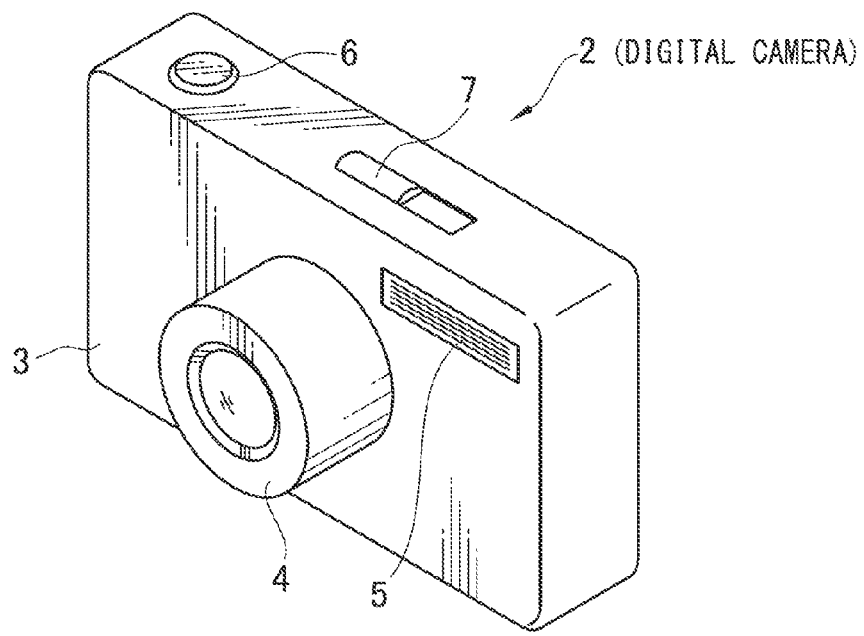
FIG. 1 is a perspective view of the front of a digital camera of first embodiment.

In FIG. 1, a digital camera 2 corresponds to an image file generation device of the present invention. The digital camera 2 includes a camera body 3 provided in its front face with a lens barrel 4 configured to include an imaging optical system and the like, a flash light emission section 5, and the like. The camera body 3 is provided at its top face with a shutter button 6, a power switch 7, and the like.

Figure 2:
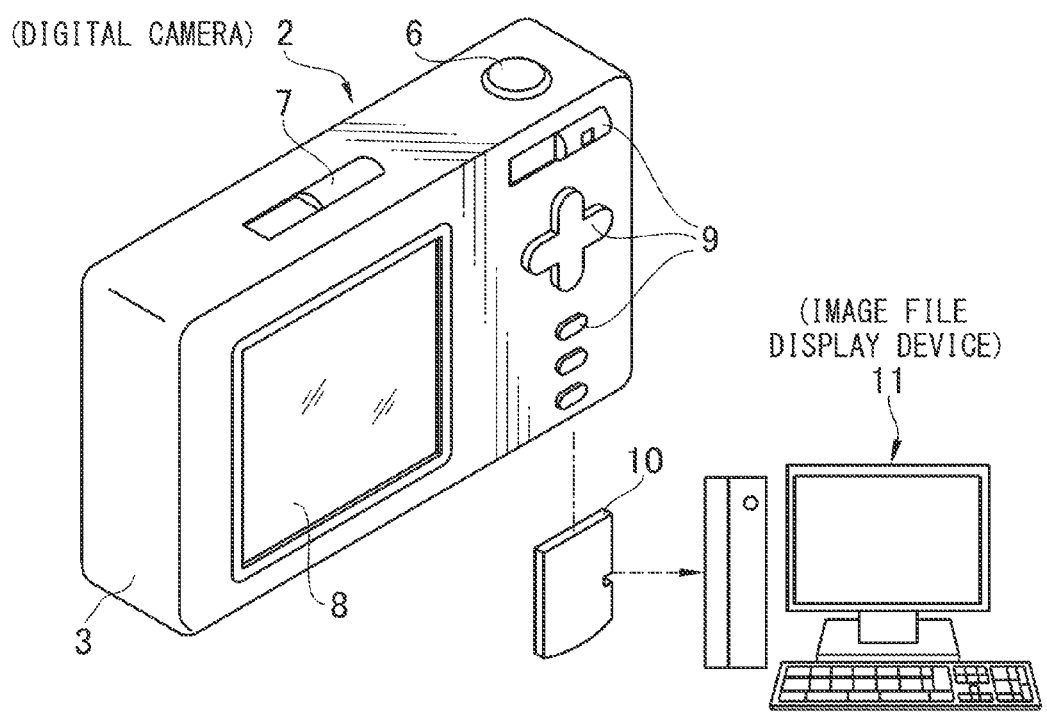
FIG. 2 is a perspective view of the back of the digital camera.

As shown in FIG. 2, the camera body 3 is provided in its back face with a display 8, and an operation section 9. The display 8 serves as an electronic view finder when photographing is on standby to display a live view image (or called as a through image). In addition, when an image is reproduced, the image is reproduced and displayed on the display 8 on the basis of image data recorded in a memory card 10.

The operation section 9 is composed of a mode shift switch, a cross key, an execute key, and the like. The mode shift switch is to be operated when an operation mode of the digital camera 2 is changed. The digital camera 2 has a photographing mode of photographing a subject to acquire photographed image data, a reproduction mode for reproducing and displaying an image on the basis of the photographed image data, and the like.

The cross key and the execute key are operated at the time of: displaying various menu screens and setting screens on the display 8; moving a cursor displayed on the menu screen and the setting screen; and determining various setting items of the digital camera 2.

The camera body 3 is provided in its bottom face with a card slot (not shown) into which the memory card 10 is to be inserted, and an insertion lid for opening and closing an opening of the card slot. The memory card 10 records photographed image data acquired by photographing a subject as an image file of various file formats. When the memory card 10 is set in an image file display device 11, the image file recorded in memory card 10 is reproduced and displayed by the image file display device 11.

The image file display device 11 has a function of reading out the image file recorded in the memory card 10 at the time of the photographing mode to display particularly a shadow portion of the photographed image data at sufficient gradation. The image file display device 11, as well as the digital camera 2, constitutes an image file generation display system that generates and displays an image file.

Figure 3:
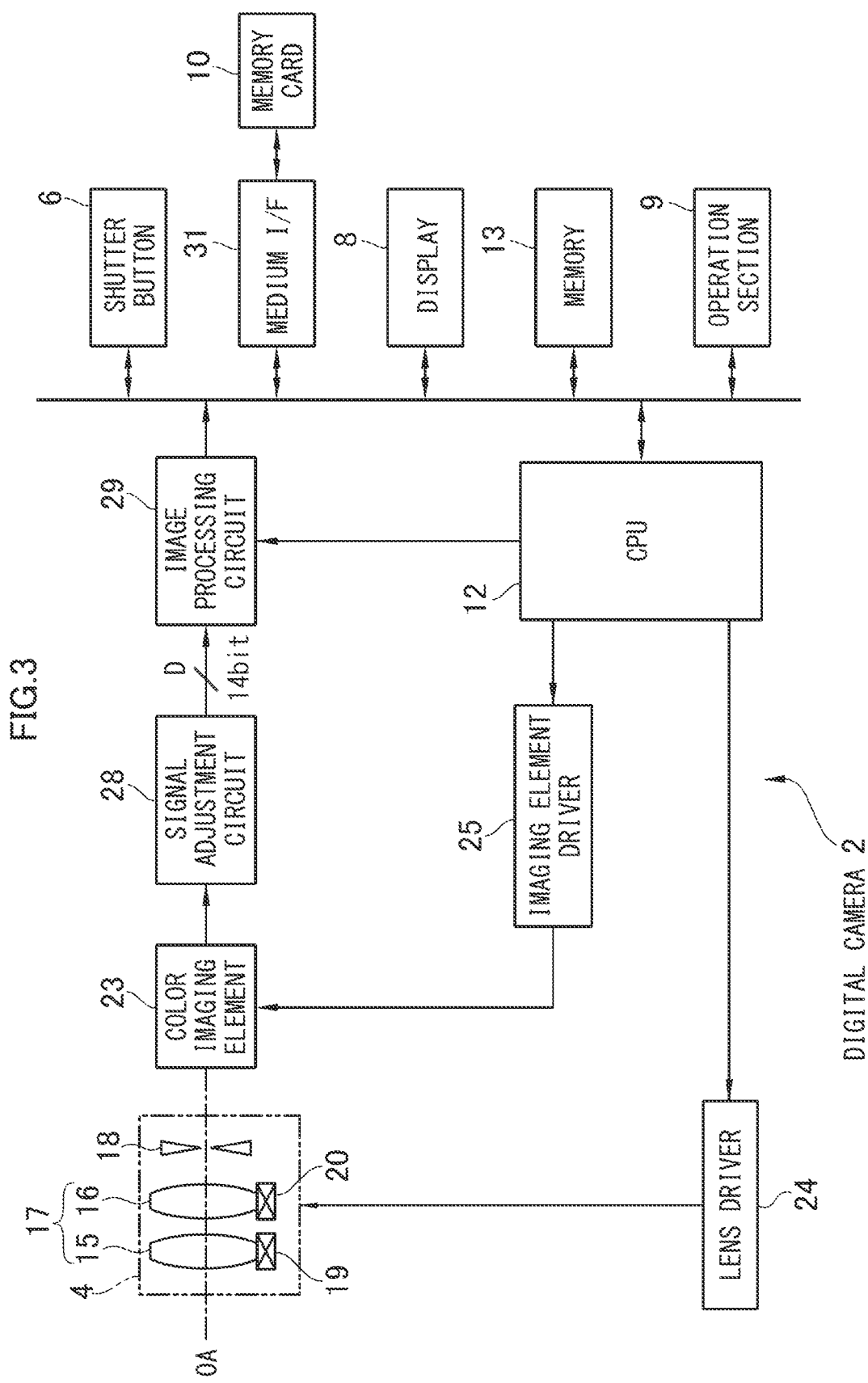
FIG. 3 is a block diagram showing an electrical configuration of the digital camera.

As shown in FIG. 3, a CPU 12 of the digital camera 2 sequentially executes various programs and data, read out from the memory 13 on the basis of a control signal from the operation section 9 to integrally control each of sections of the digital camera 2. The memory 13 includes a RAM area serving as a work memory for allowing the CPU 12 to perform processing, and as a storage for temporarily storing various data items.

The lens barrel 4 includes a photographic optical system 17 that is composed of a zoom lens 15, a focus lens 16, and the like. The zoom lens 15 and the focus lens 16 are driven by s zoom mechanism 19 and a focus mechanism 20, respectively, to be moved back and forth along an optical axis OA of the photographic optical system 17.

The mechanical shutter 18 includes a movable part (not shown) moves between a closed position for preventing subject light from entering a color imaging element 23 and an opened position for allowing the subject light to enter the color imaging element 23. Accordingly, the mechanical shutter 18 moves the movable part to each of the positions to open and close an optical path from the photographic optical system 17 to the color imaging element 23. In addition, the mechanical shutter 18 includes a diaphragm for controlling the amount of the subject light that enters the color imaging element 23. Operations of the mechanical shutter 18, the zoom mechanism 19, and the focus mechanism 20, are controlled by the CPU 12 through a lens driver 24.

The color imaging element 23 is arranged behind the photographic optical system 17. In addition, the color imaging element 23 constitutes, as well as the photographic optical system 17, the photographing section of the present invention, to convert subject light passing through the photographic optical system 17 into an electrical output signal and output the electrical output signal. As the color imaging element 23, there are used various types of imaging elements, such as a charge coupled device (CCD) color imaging element, and a complementary metal oxide semiconductor (CMOS) color imaging element. Under control of the CPU 12, an imaging element driver 25 controls drive of the color imaging element 23.

A signal adjustment circuit 28, as well as the photographic optical system 17 and the color imaging element 23, constitutes the first image data acquisition device of the present invention. The signal adjustment circuit 28 applies various signal adjusting processing steps to the output signal outputted from the color imaging element 23 to generate the RAW data D (first image data). Although the bit number "N" of the RAW data is not particularly limited, in the present embodiment, the 14-bit RAW data D is generated and outputted to the image processing circuit 29. In a case where the color imaging element 23 is a CCD type, the signal adjustment circuit 28 is composed of a CDS/AGC circuit, an A/D conversion circuit, and the like, for example, and in a case where the color imaging element 23 is a CMOS type, the signal adjustment circuit 28 is composed of an amplifier, and the like, for example.

The image processing circuit 29 applies various signal processing steps (the first signal processing and the second signal processing), such as gamma correction processing, YC conversion processing, noise reduction processing, and compression processing, to the RAW data D received from the signal adjustment circuit 28 to generate compression image data. Specifically, when the shutter button 6 is pressed during the photographing mode, the image processing circuit 29 generates the 8-bit body image data DH (second image data, refer to FIG. 4), and compresses the 8-bit body image data DH in a JPEG compression format. In addition, the image processing circuit 29 generates, other than the body image data DH described above, shadow image data DS (third image data, refer to FIG. 4) on the basis of pixels with brightness equal to or less than a predetermined shadow level Ls in respective pixels of the RAW data D, and compresses the shadow image data DS in the JPEG compression format.

During the photographing mode, the image processing circuit 29 generates image data for displaying a through image (hereinafter referred to as image data for a through image) from the RAW data, and outputs the image data for a through image to the display 8.

The compression image data compressed in the JPEG compression format by the image processing circuit 29 is recorded in the memory card 10 as an image file through a medium I/F 31. In addition, the image processing circuit 29 applies extension processing to compression image data of an image file read out from the memory card 10 through the medium I/F 31.

The medium I/F 31 records and reads out each of image data items with respect to the memory card 10. For the display 8, a liquid crystal display and the like is used to display a through image, a reproduction image, and the like.

(Configuration of an Image Processing Circuit)

Figure 4:
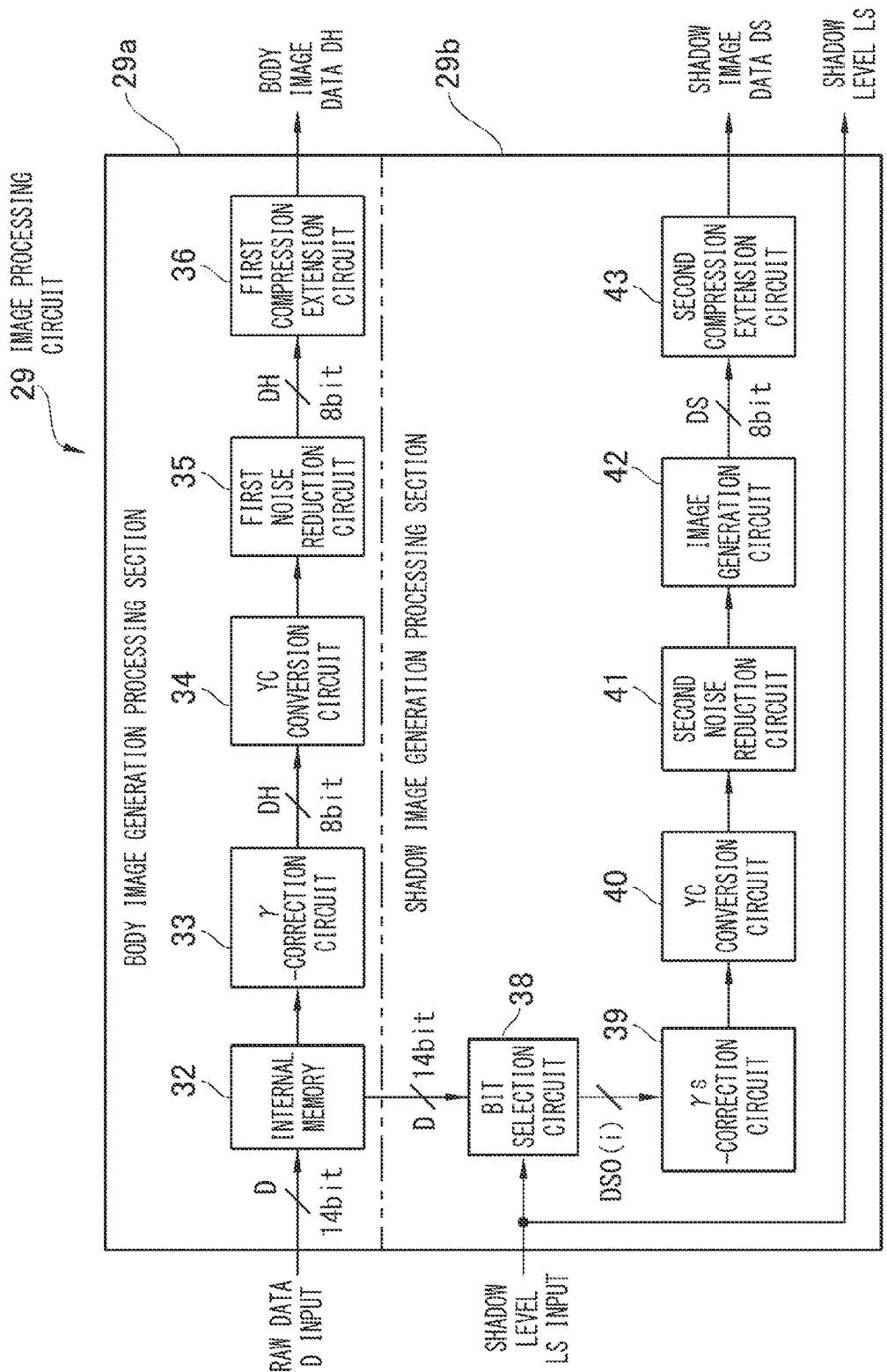
FIG. 4 is a block diagram showing an electrical configuration of an image processing circuit.

As shown in FIG. 4, the image processing circuit 29 includes a body image generation processing section (second image data generation device) 29a, a shadow image generation processing section (third image data generation device) 29b, and an internal memory 32. The internal memory 32 temporarily stores the RAW data D received from the signal adjustment circuit 28. The body image generation processing section 29a and the shadow image generation processing section 29b generate the body image data DH and the shadow image data DS, respectively, on the basis of the RAW data D read out from the internal memory 32, respectively.

The body image generation processing section 29a generates the 8-bit body image data DH on the basis of the RAW data D. The body image generation processing section 29a includes a γ-correction circuit 33, a YC conversion circuit 34, a first noise reduction circuit 35, and a first compression extension circuit 36. Each of the circuits 33 to 36 performs the first signal processing of the present invention (the γ-correction processing, the YC conversion processing, the noise reduction processing, and the compression processing).

The γ-correction circuit 33 applies correction of γ (gradation conversion (usually, 0.45 power)) to the 14-bit RAW data D read out from the internal memory 32 to generate the 8-bit body image data DH. The YC conversion circuit 34 performs the YC conversion processing for converting RGB signals of the body image data DH generated by the γ-correction circuit 33 into a brightness signal Y and color difference signals Cr and Cb.

The first noise reduction circuit 35 applies the noise reduction processing to the body image data DH to which the YC conversion processing is applied by using a noise reduction filter such as a low pass filter, for example. The first compression extension circuit 36 compresses the body image data DH to which the noise reduction processing is applied in the JPEG compression format. The body image data DH compressed in the JPEG compression format is recorded in the memory card 10.

Figure 5:
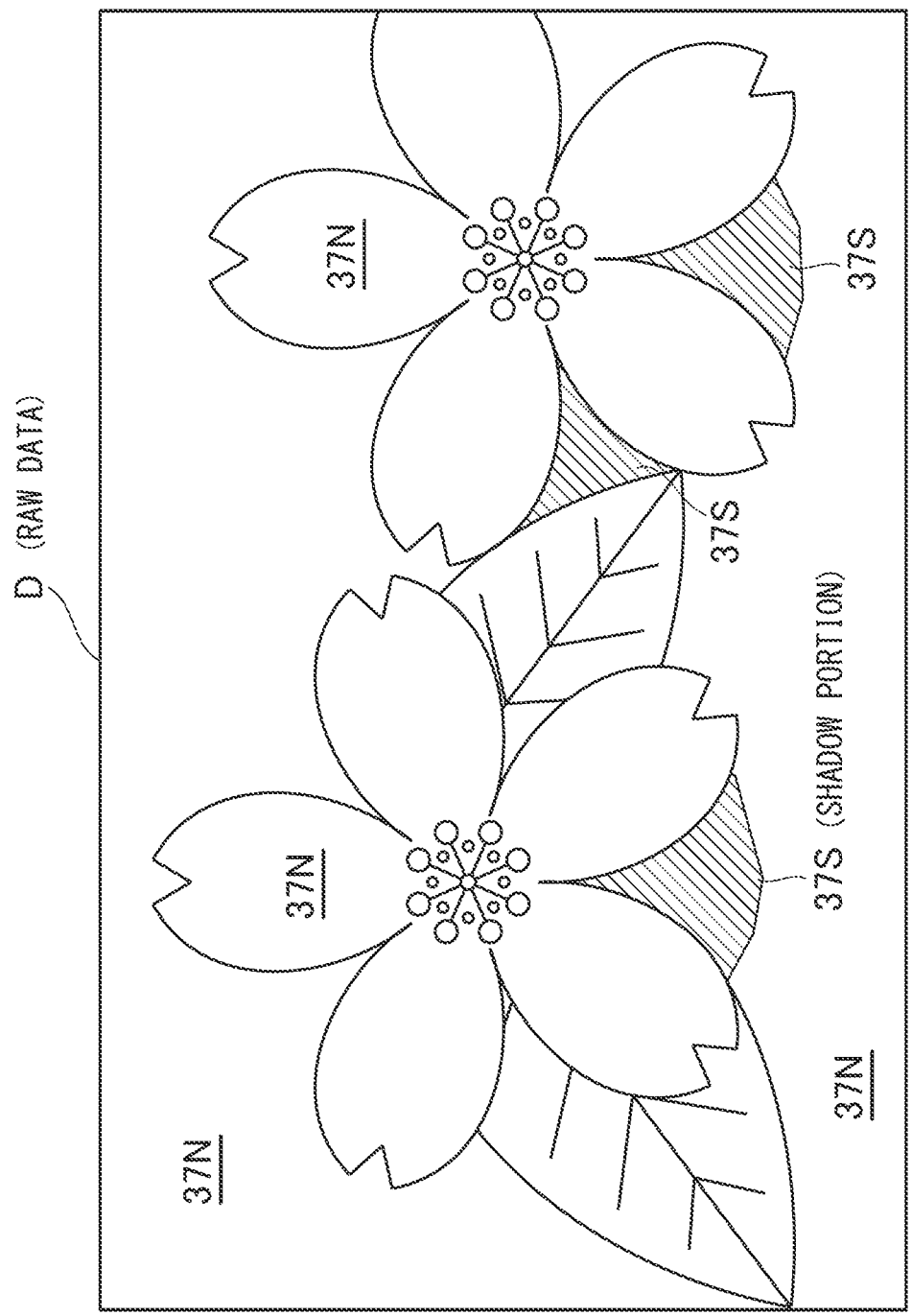
FIG. 5 is an illustration for describing shadow portions in a display image.

As shown in FIG. 5, the shadow image generation processing section 29b selects pixels of shadow portions (low brightness portions) 37S with brightness equal to or less than the predetermined shadow level (brightness level) Ls from among the respective pixels of the RAW data D to generate the shadow image data DS. A reference numeral 37N designates a normal brightness portion other than the shadow portions.

The shadow portions 37S is a region in which brightness is 1% or less of maximum brightness, for example, and corresponds to (0 to 3)/255 in 8-bit image data. In the present embodiment, the shadow level Ls is 3 (8-bit image). The shadow image generation processing section 29b generates the shadow image data DS in which the shadow level Ls of shadow portions is 3 (2 bits), and generates the lower-order 8 bits (refer to FIG. 13) of the 14-bit RAW data D as the shadow image data DS when generating the 8-bit shadow image data DS.

The shadow level Ls can be set at an arbitrary value by using the operation section 9, for example, and information on the shadow level Ls set by using the operation section 9 is inputted into the shadow image generation processing section 29b (a bit selection circuit 38) through the CPU 12.

With reference to FIG. 4 again, the shadow image generation processing section 29b includes the bit selection circuit 38, a γs-correction circuit 39, a YC conversion circuit 40, a second noise reduction circuit 41, an image generation circuit 42, and a second compression extension circuit 43. Each of the circuits 39 to 43 other than the bit selection circuit 38 performs the second signal processing of the present invention (the γ-correction processing, the YC conversion processing, the noise reduction processing, and the compression processing).

The bit selection circuit 38 determines whether or not each pixel value (brightness value) D (i) of each pixel (i) [i=0 to $(2^{14}-1)$ or 1 to $2^{14}$] of the RAW data D read out from the internal memory 32 is equal to or less than the shadow level Ls, on the basis of the shadow level Ls received from the CPU 12. Then, the bit selection circuit 38 selects a low brightness pixel (i) in which the pixel value D (i) is equal to or less than the shadow level Ls, and outputs the pixel value D(i) to the γs-correction circuit 39 as a pixel value DS0(i) constituting the shadow image data DS.

In addition, the bit selection circuit 38 indicates the pixel value DS0 (i) of a pixel (i) whose pixel value D (i) is more than the shadow level Ls as "00h".

The γs-correction circuit 39 applies correction of γs (gradation conversion) to the pixel value DS0 (i) of the low brightness pixel (i) selected by the bit selection circuit 38. The γs may have characteristics that are the same as the characteristics of the γ described above (usually, 0.45 power), however, the γs usually has linear characteristics to prevent bit omission caused by a bit close to 0 that is lifted.

The YC conversion circuit 40 is basically identical with the YC conversion circuit 34 described above, and performs the YC conversion processing for converting RGB signals of the pixel value DS0 (i) of the low brightness pixel (i) to which the γs-correction is applied into a brightness signal Y and color difference signals Cr and Cb.

The second noise reduction circuit 41 applies the noise reduction processing to the pixel value DS0 (i) of the low brightness pixel (i) to which the YC conversion processing is applied, by using a noise reduction filter and the like. Accordingly, a pixel value DS (i) constituting the shadow image data DH is generated. Then, the shadow image data DS has a favorable image (smooth image) by reducing wide range noise as compared with the body image data DH. Thus, the second noise reduction circuit 41 uses a noise reduction filter having characteristics different from those of the first noise reduction circuit 35.

Specifically, as shown in FIG. 6, the noise reduction filters of the first noise reduction circuit 35 and the second noise reduction circuit 41 are indicated as a "noise reduction 1" and a "noise reduction 2", respectively. The noise reduction 2 reduces a wide range noise as compared with the noise reduction 1, so that a cutoff frequency fS2 of the noise reduction 2 is set lower than a cutoff frequency fs1 of the noise reduction 1.

Figure 12:
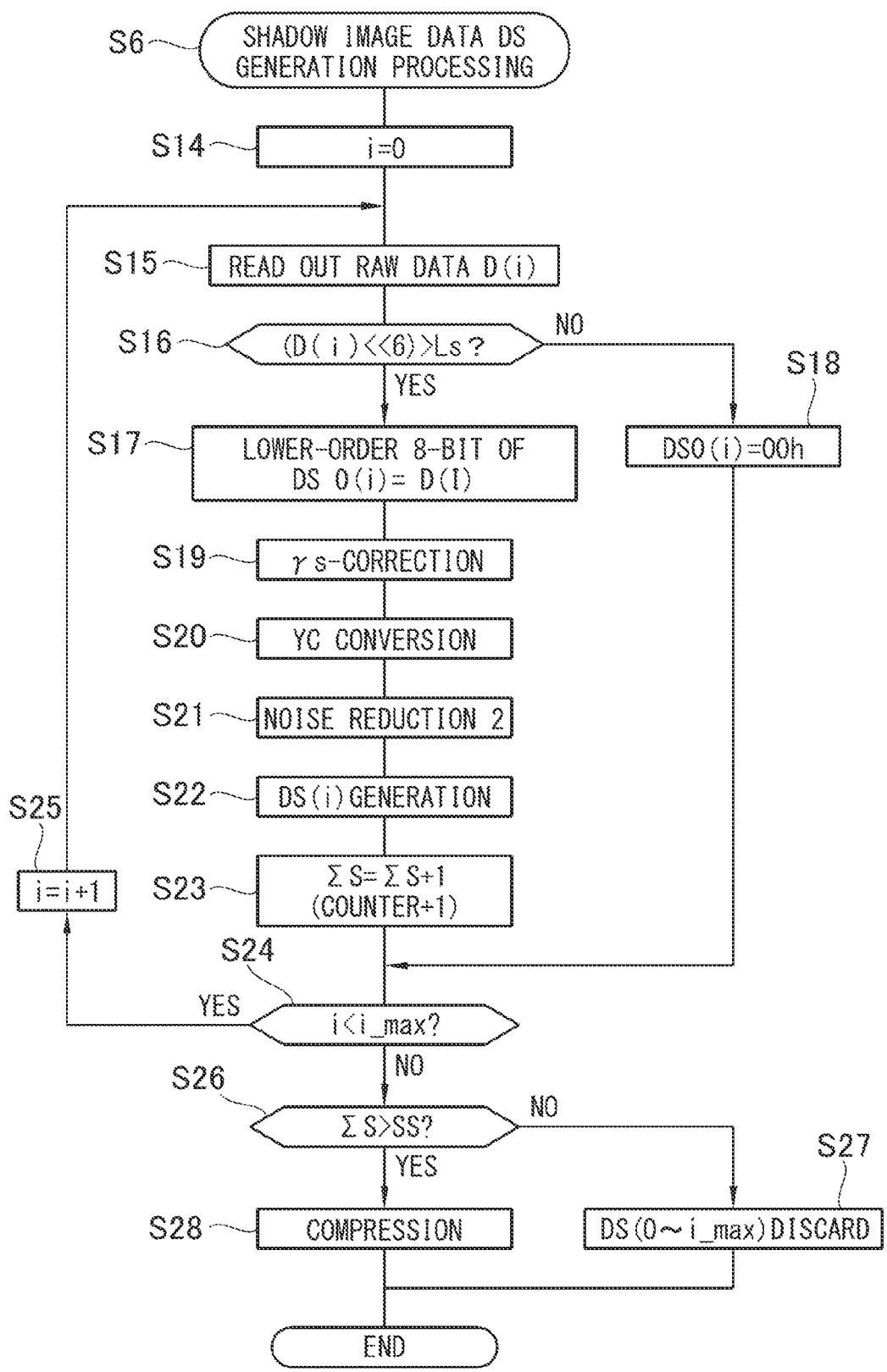
FIG. 12 is a flow chart showing a flow of processing of generating shadow image data.

As shown in FIGS. 4 and 7, the image generation circuit 42 counts a pixel number of low brightness pixels (i) to which the noise reduction processing is applied, and generates the 8-bit shadow image data DS on the basis of a pixel value DS (i) of each of the low brightness pixels (i), in a case where the pixel number is more than a predetermined threshold value SS (refer to FIG. 12). Then, with respect to a pixel (i) whose pixel value D (i) is determined to be more than the shadow level Ls by the bit selection circuit 38, "00h" (displayed as "00" in FIG. 7) is inserted to a pixel value DS0 (i) of the pixel (i).

On the other hand, if the pixel number of the low brightness pixels (i) is equal to or less than the threshold value SS, the image generation circuit 42 does not generate the shadow image data DS. Accordingly, in a case where a ratio of shadow portions 37S in the RAW data D is low, the shadow image data DS is not generated.

As shown in FIGS. 4, 8A, and 8B, the second compression extension circuit 43 compresses the shadow image data DS in the JPEG compression format. Then, the shadow image data DS includes the values "00h" that continue with a high frequency, as shown in FIG. 7. Thus, the second compression extension circuit 43 performs the JPEG compression by using a Huffman code table for the shadow image data DS, to which code lengths different from those in a normal JPEG Huffman code table are assigned.

Specifically, in the JPEG compression of the body image data DH by the first compression extension circuit 36, the Huffman code table shown in FIG. 8A is used. On the other hand, the shadow image data DS includes many values 00h, so that a frequency of the value 00h in a DC difference close to 0 increases as compared with the body image data DH. Thus, as shown in FIG. 8B, in the Huffman code table used in the second compression extension circuit 43, a short code length can be assigned as Huffman codes of DC differences of 0 and close to 0. As a result, it is possible to reduce the amount of the shadow image data DS after the compression. The shadow image data DS compressed in the JPEG compression format is recorded in the memory card 10.

It is possible to reduce the amount of the shadow image data DS, even if another method other than the JPEG is used as a compression processing method performed by the second compression extension circuit 43. As another method, encoding using a zero-run length is used, for example.

Figure 9:
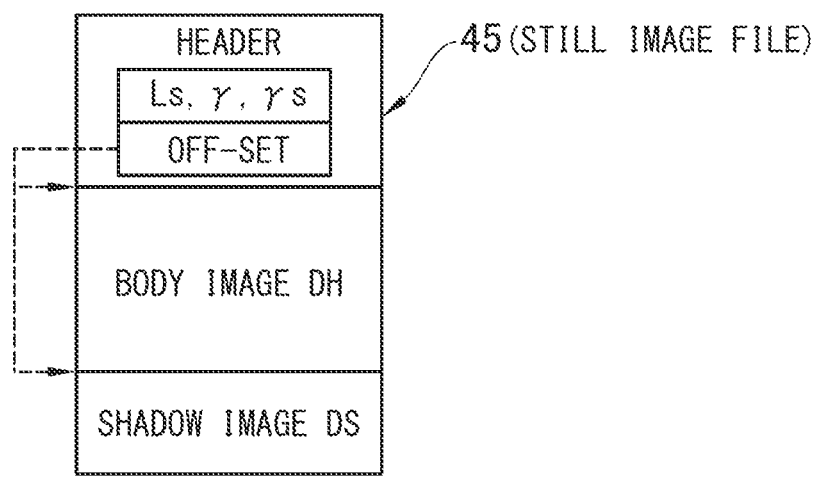
FIG. 9 is an illustration for describing a still image file.

As shown in FIG. 9, the body image data DH and the shadow image data DS, generated and compressed in the JPEG compression format by the image processing circuit 29, and shadow level information (brightness level information) on the shadow level Ls set by the bit selection circuit 38, are associated with each other and are stored in the memory card 10 as one still image file 45.

The still image file 45 has a header that stores shadow level information (indicated as Ls in Figures), γ and γs used in the γ-correction circuit 33 and the γs-correction circuit 39, respectively, and an off-set address (indicated as "off-set" in Figures) showing addresses of the body image data DH and the shadow image data DS. In a case where the shadow image data DS is not generated in the image generation circuit 42, the body image data DH, the γ, and the off-set address of the body image data DH, are stored in the memory card 10 as one still image file 45.

(Operation of a Digital Camera)

Next, with reference to FIG. 10, an operation of the digital camera 2 configured as above, particularly processing of generating and recording the still image file 45, will be described. When an operation mode of the digital camera 2 is set at the photographing mode by using the operation section 9 (step S1), the CPU 12 inputs predetermined shadow level information (Ls=3) to the bit selection circuit 38 (step S2).

Subsequently, the CPU 12 controls an operation of the mechanical shutter 18 through the lens driver 24 as well as drives the color imaging element 23 through the imaging element driver 25 to start imaging processing (step S3). The mechanical shutter 18 is opened and closed at a predetermined shutter speed so that a signal charge is accumulated in each of pixels of the color imaging element 23. Then, under control of the imaging element driver 25, each of the pixels of the color imaging element 23 outputs a signal.

The signal adjustment circuit 28 applies various signal adjusting processing steps to the signal outputted from the color imaging element 23 to generate the RAW data D, and outputs the RAW data D to the image processing circuit 29. The image processing circuit 29 generates image data for displaying a through image from the RAW data D, and outputs the image data for displaying a through image to the display 8. Accordingly, a through image is displayed on the display 8.

When the shutter button 6 is pressed, the color imaging element 23 outputs signals for one frame, and the signal adjustment circuit 28 generates the RAW data D for one frame. The RAW data D is outputted to the image processing circuit 29 to be temporarily stored in the internal memory 32 (step S4). Next, processing of generating the body image data DH by the image processing circuit 29 (step S5) and processing of generating the shadow image data DS (step S6) are started. Step S5 and step S6 may start at the same time, or either step S5 or step S6 may start first.

(Processing of Generating Body Image Data)

Figure 11:
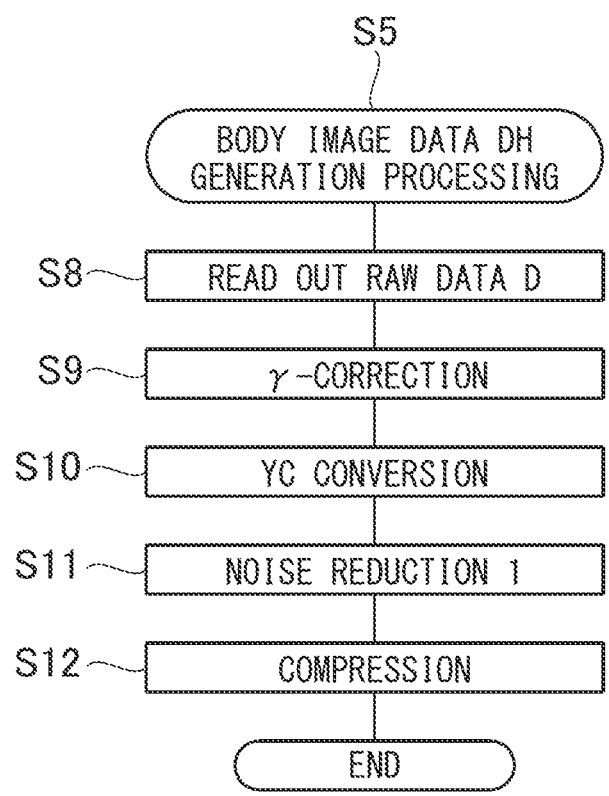
FIG. 11 is a flow chart showing a flow of processing of generating body image data.

As shown in FIG. 11, when the processing of generating the body image data DH is started, each of circuits of the body image generation processing section 29a is operated. The γ-correction circuit 33 reads out the RAW data D from the internal memory 32 (step S8), and applies the γ-correction (gradation conversion) to the RAW data D to generate the body image data DH, and then outputs the body image data DH to the YC conversion circuit 34 (step S9). The YC conversion circuit 34 applies the YC conversion processing to the body image data DH received from the γ-correction circuit 33, and then outputs the body image data DH to the first noise reduction circuit 35 (step S10).

The first noise reduction circuit 35 applies the noise reduction processing to the body image data DH to which the YC conversion processing is applied by using the noise reduction filter shown in the "noise reduction 1" in FIG. 6, and then outputs the body image data DH to the first compression extension circuit 36 (step S11). The first compression extension circuit 36 compresses the body image data DH to which the noise reduction processing is applied by using the Huffman code table shown in FIG. 8A in the JPEG compression format (step S12). Up to this point, the processing of generating body image data is completed.

(Processing of Generating the Shadow Image Data DS)

As shown in FIG. 12, when the processing of generating the body image data DH is started, each of circuits of the shadow image generation processing section 29b is operated.

The bit selection circuit 38 reads out a pixel value D (0) of a 0th pixel (0) in RAW data from the internal memory 32 (step S14 and step S15). Then, the bit selection circuit 38 determines whether or not the pixel value D (0) is equal to or less than a shadow level Ls of 3 (lower-order 2 bits) in a 8-bit image, that is, determines whether or not the pixel value D (0) corresponds to lower-order 8 bits in the 14-bit RAW data D (refer to FIG. 13) (step S16).

Next, the bit selection circuit 38 outputs a pixel value of a low brightness pixel (0) in which the pixel value D (0) is equal to or less than the shadow level Ls, to the γs-correction circuit 39 as a pixel value DS0 (0) (step S17). On the other hand, with respect to a pixel (0) in which the pixel value D (0) is more than the shadow level Ls, the bit selection circuit 38 indicates the pixel value DS0 (0) as "00h" (step S18).

The γs-correction circuit 39 applies the γs-correction (gradation conversion) to the pixel value DS0 (0) of the low brightness pixel (0) selected by the bit selection circuit 38, and then outputs the pixel value DS0 (0) to the YC conversion circuit 40 (step S19). The YC conversion circuit 40 applies the YC conversion processing to the pixel value DS0 (0) received from the γs-correction circuit 39, and then outputs the pixel value DS0 (0) to the second noise reduction circuit 41 (step S20).

The second noise reduction circuit 41 applies the noise reduction processing to the pixel value DS0 (0) to which the YC conversion processing is applied, by using the noise reduction filter shown in the "noise reduction 2" in FIG. 6 to generate a pixel value DS (0), and then outputs the pixel value DS (0) to the image generation circuit 42 (steps S21 and S22).

The image generation circuit 42 temporarily stores the low brightness pixel (0) to which the noise reduction processing is applied, as well as increases a pixel number of the low brightness pixel by 1 (ΣS=ΣS+1) (step S23).

If read-out of all pixels D(i) in the RAW data is not completed (YES at step S24), the bit selection circuit 38 reads out a pixel value D (1) of a first pixel (1) in the RAW data from the internal memory 32 (step S15). Then, the processing steps of step S16 to step S23 are performed. Likewise, pixel values D (i) of all pixels in the RAW data are read out in order, and the processing steps of step S16 to step S23 described above are repeatedly performed (steps S24 and S25).

After the processing up to step S23 for the last pixel D (i_max) is completed (NO at step S24), the image generation circuit 42 determines whether or not a pixel number ΣS of low brightness pixels (i) is more than the threshold value SS by checking a count value in a counter (step S26). If the pixel number ΣS is equal to or less than the threshold value SS, the image generation circuit 42 discards all pixel values DS (0 to i_max) stored before (step S27). Accordingly, unnecessary shadow image data DS in which a ratio of the shadow portions 37S is low is prevented from being recorded in the RAW data D.

If the pixel number ΣS is more than the threshold value SS, the image generation circuit 42 generates the 8-bit shadow image data DS on the basis of a pixel value DS (i) of each of the low brightness pixels (i). Then, with respect to the pixel (i) whose pixel value D (i) is determined to be more than the shadow level Ls before, "00h" is inserted as a pixel value DS 0 (i) of the pixel (i). The image generation circuit 42 outputs the generated shadow image data DS to the second compression extension circuit 43.

The second compression extension circuit 43 compresses the shadow image data DS in the MEG compression format by using the Huffman code table shown in FIG. 8B (step S28). Up to this point, the processing of generating shadow image data is completed.

(Processing of Recording a Still Image File)

With reference to FIG. 10 again, the body image data DH and the shadow image data DS, compressed in the JPEG compression format by the image processing circuit 29, the shadow level information (Ls=3), and γ and γs, are associated with each other, and are stored in the memory card 10 as one still image file 45 shown in FIG. 9 (step S29). If the photographing mode is continued, each of the processing steps described above is repeatedly performed.

(Operation Effect of a Digital Camera)

Figure 13:
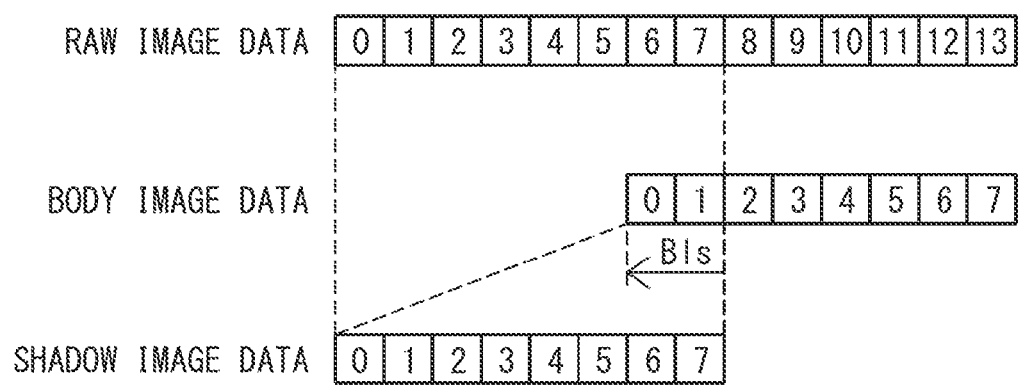
FIG. 13 is an illustration for describing shadow image data that has the number of gradations more than the number of gradations assigned to pixel values equal to or less than a shadow level of body image data.

As shown in FIG. 13, the 8-bit body image data DH particularly lacks the shadow portions 37S in which pixel values are equal to or less than the shadow level Ls of 3, namely gradations corresponding to lower-order 2 bits. In FIG. 13, a bit number of the shadow level Ls is indicated as "Bls" (here "Bls=2"). In order to deal with the lack of gradations in the shadow portions 37S described above, in the present invention, lower-order 8 bits of the 14-bit RAW data D corresponding to lower-order 2 bits of the body image data DH (the Bls in FIG. 13 shows a bit number of the Ls) are separately recorded as shadow image data DS. The shadow image data DS has the number of gradations more than the number of gradations assigned to pixel values of the body image data DH, the pixel values being equal to or less than the shadow level Ls of 3. Accordingly, when performing reproduction and display, the image file display device 11 described later displays an image of the shadow portions 37S by using the shadow image data DS, so that it is possible to improve gradation reproducibility of the shadow portions 37S.

In addition, since the present invention allows only the 8-bit body image data DH and the 8-bit shadow image data DS to be recorded as the still image file 45, it is possible to sufficiently reduce the amount of recorded data as compared with the recording method described in PTL 1 that records RAW data, the recording method described in NPL 1 that records difference data of RAW data, the recording method described in PTL 3 that records difference information for restoring 12-bit gradation information, and the like. Further, since the body image data DH is recorded by a standard recording method, the body image data DH can be reproduced and displayed by a normal image display device. As a result, compatibility is secured, unlike the recording method described in PTL 4 that records image data by quantizing pixels at a quantization bit number different for each of the pixels.

(Configuration of the Second Embodiment (an Image File Display Device))

Figure 14:
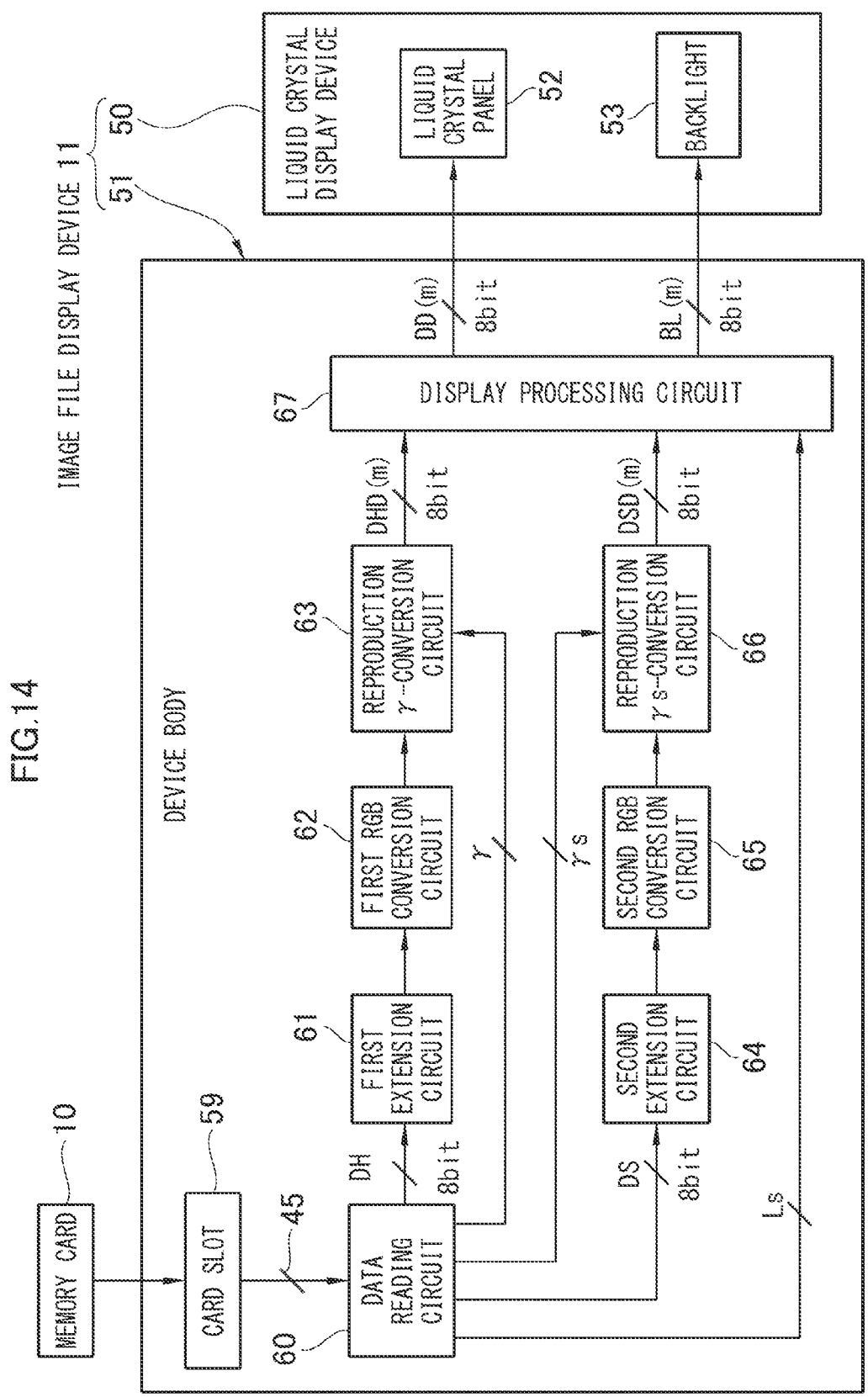
FIG. 14 is a block diagram showing an electrical configuration of an image file display device of a second embodiment.

Next, with reference to FIG. 14, the image file display device 11 of the present invention (hereinafter referred to simply as a display device 11) will be described. The display device 11 reproduces and displays the still image file 45 recorded by the digital camera 2 described above, and performs multi-gradation display of the shadow portions 37S by using the shadow image data DS. The display device 11 is mainly composed of a liquid crystal display device (display device) 50, and a device body 51.

Figure 15:
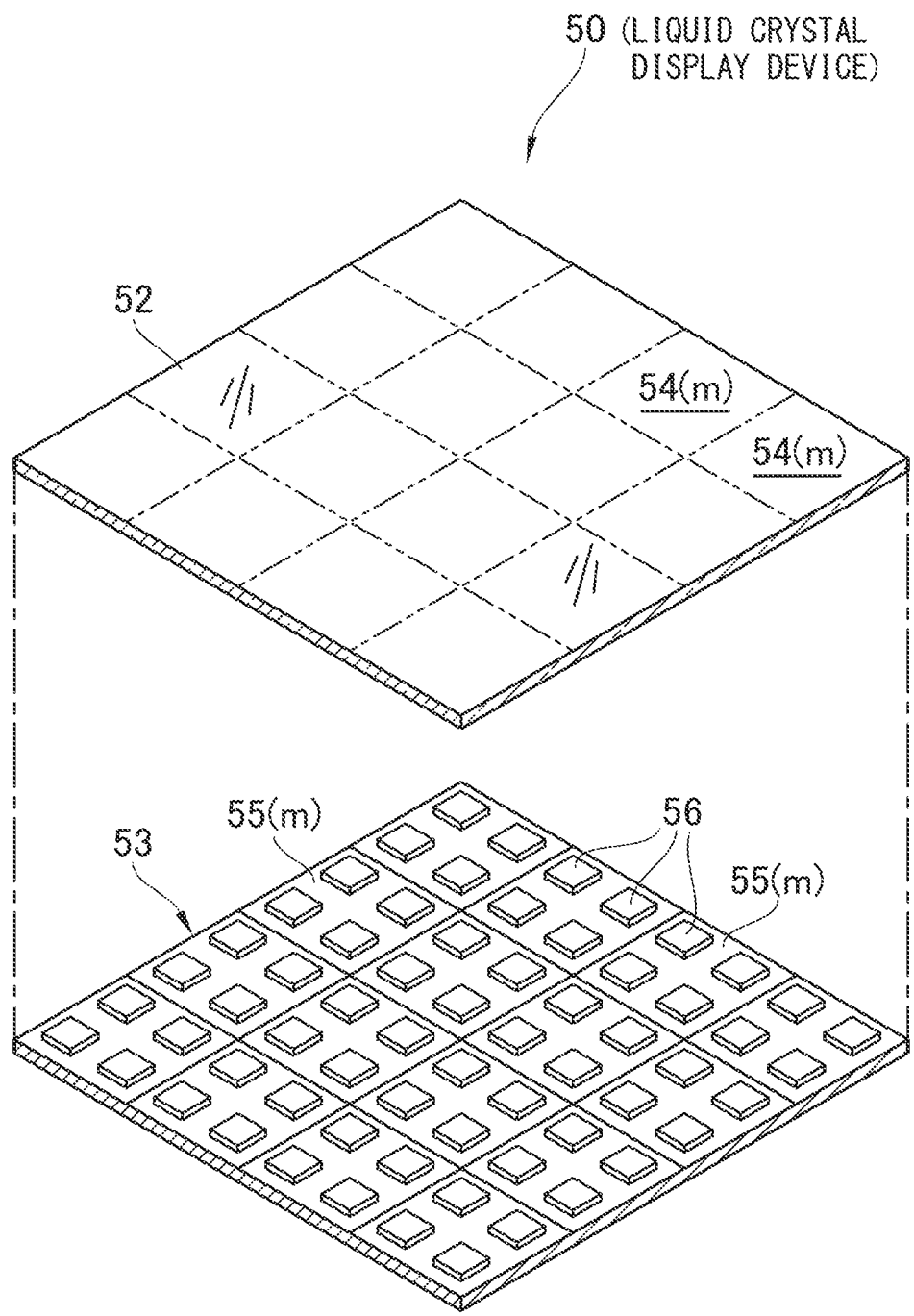
FIG. 15 is an exploded perspective view of a liquid crystal display device.

As shown in FIG. 15, the liquid crystal display device 50 displays an image (a still image and a dynamic image), character information, and the like, by control of the device body 51. The liquid crystal display device 50 is composed of a liquid crystal panel (liquid crystal display (LCD)) 52, and a backlight 53.

The liquid crystal panel 52 is composed of a large number of liquid crystal elements with adjustable light transmittance that are arranged to form a two-dimensional array. In a case where a stereoscopic image (3D image) is viewed, there is used the liquid crystal panel 52 capable of stereopsis, including a lenticular lens and the like.

The backlight 53 is arranged on a back face side of the liquid crystal panel 52. The backlight 53 includes a plurality of illumination sections 55 ($m$) that individually illuminates each of segments 54 ($m$) that is formed by dividing a screen of the liquid crystal panel 52. Here, the segments 54 ($m$) is an area composed of horizontal 16 pixels by vertical 16 pixels, for example. In addition, "m" shows the number of segments, and is indicated as 0 to 63 (or 1 to 64) in a case where the screen is divided into 64 segments, for example.

Each of the illumination sections 55 ($m$) is provided with one or more light emitting diodes (hereinafter referred to as an LED) 56. Brightness of each of the illumination sections 55 ($m$) can be independently controlled to enable so-called local dimming control (or called as area control). The local dimming control is performed to enable 9-bit or more gradation display even if display gradation of the liquid crystal panel 52 is 8-bit. That is, in a case where a bit number of body image data is indicated as M (M is 8 in the present embodiment), the liquid crystal display device 50 is capable of Q (Q>M)-bit gradation display.

With reference to FIG. 14 again, the device body 51 includes mainly a card slot 59, a data reading circuit 60, a first extension circuit 61, a first RGB conversion circuit 62, a reproduction γ-conversion circuit 63, a second extension circuit 64, a second RGB conversion circuit 65, a reproduction γs-conversion circuit 66, and a display processing circuit 67.

The card slot 59 allows the memory card 10 in which the still image file 45 and the like are recorded in the digital camera 2 to be set into the card slot 59. In addition, the card slot 59, as well as the data reading circuit 60 described later, constitutes the image file acquisition device of the present invention.

The data reading circuit 60 reads out the still image file 45 from the memory card 10 set into the card slot 59, and outputs body image data DH and shadow image data DS, included in the still image file 45, to the first extension circuit 61 and the second extension circuit 64, respectively. In addition, the data reading circuit 60 reads out each piece of information (refer to FIG. 9) recorded in a header of the still image file 45, and outputs shadow level information (Ls), γ, and γs, in the each piece of information, to the display processing circuit 67, the reproduction γ-conversion circuit 63, and the reproduction γs-conversion circuit 66, respectively.

The first extension circuit 61 applies JPEG extension to the body image data DH compressed in the JPEG compression format. The first RGB conversion circuit 62 performs RGB conversion processing of converting a brightness signal Y and color difference signals Cr and Cb of the body image data DH to which the JPEG extension is applied, into RGB signals.

The reproduction γ-conversion circuit 63 applies conversion processing with reproduction γ (or called as inverse γ) with inverse characteristics of γ at the time of photographing (usually, 2.2 power) to the body image data DH to which the RGB conversion processing is applied, on the basis of information on the γ received from the data reading circuit 60 to generate body image data DHD corresponding to the liquid crystal display device 50. Then, the reproduction γ-conversion circuit 63 divides the body image data DHD for each of segments 54 ($m$) (such as 64-division) to output the body image data DHD (m) corresponding to each of the segments 54 ($m$) to the display processing circuit 67 in order.

The second extension circuit 64 applies the JPEG extension to the shadow image data DS compressed in the JPEG compression format. The second RGB conversion circuit 65 performs the RGB conversion processing of converting a brightness signal Y and color difference signals Cr and Cb of the shadow image data DS to which the JPEG extension is applied, into RGB signals.

The reproduction γs-conversion circuit 66 applies conversion processing with reproduction γs (inverse γs) with inverse characteristics of γs at the time of photographing to the shadow image data DS to which the RGB conversion processing is applied, on the basis of information on the γs received from the data reading circuit 60 to generate shadow image data DSD corresponding to the liquid crystal display device 50. Then, the reproduction γs-conversion circuit 66 divides the shadow image data DSD for each of segments 54 ($m$) (such as 64-division) to output the shadow image data DSD (m) corresponding to each of the segments 54 ($m$) to the display processing circuit 67 in order.

The display processing circuit 67 controls display processing of the liquid crystal display device 50, and outputs 8-bit display output data DD (m) corresponding to each of segments 54 ($m$) of the liquid crystal display device 50, and a 8-bit backlight brightness setting value (hereinafter referred to as simply backlight brightness) BL (m) showing brightness of each of illumination sections 55 ($m$), on the basis of input data and information from each of the circuits 60, 63, and 66.

In addition, the display processing circuit 67 outputs the display output data DD (m) to the liquid crystal panel 52 so that light transmittance of each of liquid crystal elements in each of the segments 54 ($m$) is controlled on the basis of the display output data DD (m). Further, the display processing circuit 67 outputs backlight brightness BL (m) to the backlight 53 so that brightness of each of illumination sections 55 ($m$) corresponding to each of the segments 54 ($m$) is controlled on the basis of the backlight brightness BL (m). Accordingly, an image is displayed on a screen of the liquid crystal panel 52.

(Configuration of a Display Processing Circuit)

Figure 16:
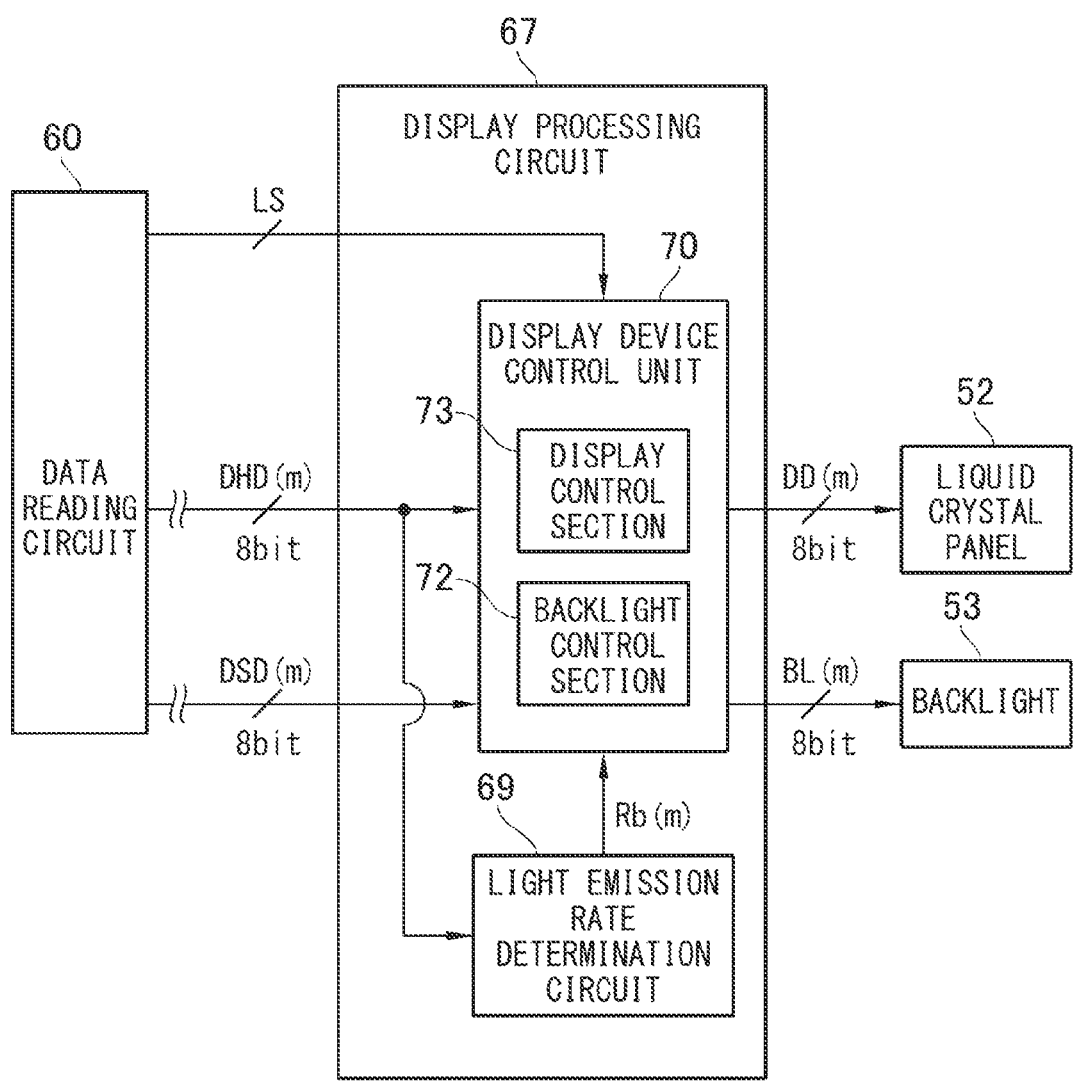
FIG. 16 is a block diagram showing an electrical configuration of a display processing circuit.

As shown in FIG. 16, the display processing circuit 67 includes a light emission rate determination circuit (light emission rate determination device) 69, and a display device control unit 70.

The light emission rate determination circuit 69 calculates a backlight light emission rate Rb (m) for each of the segments 54 ($m$), corresponding to the light emission rate of the present invention, on the basis of the body image data DHD (m). The light emission rate Rb (m) is calculated by using an expression (1) below, where the "Peak (DHD (m))" corresponds to the representative value of the present invention, and is a peak value of pixel values (brightness values) of the body image data DHD (m). The light emission rate determination circuit 69 calculates the light emission rate Rb (m) of each of the segments 54 (*m*) in order, and sequentially outputs the calculation result to the display device control unit 70.

$$Rb(m)=255/\text{Peak}(DHD(m)) \qquad \text{Expression (1)}$$

In the expression above, although the light emission rate Rb (m) is calculated by using the Peak (DHD (m)), an average value of pixel values (brightness values) of the body image data DHD (m) is calculated as the representative value of the present invention so that the light emission rate Rb (m) may be calculated by using the average value, for example.

The display device control unit 70 determines the display output data DD (m) and the backlight brightness BL (m) on the basis of the body image data DHD (m), the shadow image data DSD (m), the light emission rate Rb (m), and the shadow level information, and outputs the display output data DD (m) and the backlight brightness BL (m) to the liquid crystal panel 52 and the backlight 53, respectively. The display device control unit 70 includes a backlight control section (backlight control device) 72, and a display control section (display control device) 73.

The backlight control section 72 calculates the backlight brightness BL (m) on the basis of the light emission rate Rb (m) calculated by the light emission rate determination circuit 69. The backlight brightness BL (m) is calculated by using an expression (2) below, where the "BL_peak" is a brightness setting maximum value of the liquid crystal display device 50. In addition, the backlight control section 72 calculates the backlight brightness BL (m) whenever receiving a new light emission rate Rb (m) from the light emission rate determination circuit 69, and outputs the calculation result to the backlight 53.

$$BL(m)=BL\_Peak/Rb(m) \qquad \text{Expression (2)}$$

In the calculation, since the light emission rate determination circuit 69 described above uses a peak value of pixel values (brightness values) of the body image data DHD (m) as the representative value of the present invention, it is possible to reduce the backlight brightness BL (m) in a segment 54 (*m*) in which the peak value is relatively small so that power can be saved.

The display control section 73 calculates display output data DD (m) for each of the segments 54 (*m*). In addition, the display control section 73 operates in a normal display mode in a case where the still image file 45 does not include the shadow image data DS, and operates in a shadow portion image quality improvement mode (hereinafter referred to as simply an image quality improvement mode) in a case where the still image file 45 includes the shadow image data DS.

The normal display mode is a display mode that corresponds to display of a conventional 8-bit image. During the normal display mode, the display control section 73 acquires the display output data DD (m) corresponding to each of the segments 54 (*m*) on the basis of the body image data DHD (m) and the light emission rate Rb (m), and outputs the display output data DD (m) to the liquid crystal panel 52 in order.

The image quality improvement mode is a display mode that allows the shadow portions 37S to be displayed at a multi-gradation. During the image quality improvement mode, the display processing circuit 67 acquires display output data DD (m) corresponding to each of the segments 54 (*m*) on the basis of the body image data DHD (m), the shadow image data DSD (m), the shadow level information (Ls), and the light emission rate Rb (m), and outputs the display output data DD (m) to the liquid crystal panel 52 in order.

(Determination of Display Output Data DD (m) During the Normal Display Mode)

Figure 17:
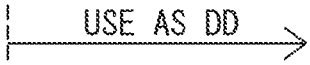
FIG. 17 is an illustration for describing processing of generating display output data at the time of a normal display mode.

During the normal display mode, the display control section 73 calculates display output data DD (m) for each of pixels in each of the segments 54 (*m*). In a case where a pixel value (brightness value) of an i-th pixel of body image data DHD (m) is indicated as a DHD (m,i), the display control section 73 indicates multiplication data in which the pixel value DHD (m,i) is multiplied by the light emission rate Rb (m) as display output data DD (m,i). Here, in a case where each of the segments 54 (*m*) is composed of 16 pixels by 16 pixels, "i" is indicated as 0 to $(16^2-1)$ or 1 to $16^2$. With reference to FIG. 17, calculation of the display output data DD (m,i) during the normal display mode will be specifically described below.

FIG. 17 shows a portion (A) that is 14-bit RAW data D, and a portion (B) that is 8-bit body image data DHD. In a case where the light emission rate Rb (m) is 4, for example, multiplication data [DHD (m,i)×Rb (m)] becomes a value obtained by multiplying the pixel value DHD (m,i) by 4, as shown in a portion (C) in FIG. 17, namely a value obtained by shifting the pixel value DHD (m,i) by 2 bits. That is, since the backlight brightness BL (m) becomes ¼ times the brightness setting maximum value on the basis of the expression (2) above, light transmittance of a pixel (i) is quadrupled by quadrupling the pixel value DHD (m,i) to allow a display brightness level in the pixel (i) to be the same as the normal level [(¼)×4=1]. Accordingly, the display output data DD (m,i) [=DHD (m,i)×Rb (m)] is calculated.

The display control section 73 calculates display output data DD (m,i) for all pixels (i) in one of the segments 54 (*m*). Accordingly, display output data DD (m) corresponding to the one of the segments 54 (*m*) is acquired. Likewise, display output data DD (m) corresponding to each of all the segments 54 (*m*) is acquired.

(Determination of Display Output Data DD (m) During the Image Quality Improvement Mode)

The display control section 73 during the image quality improvement mode as well as during the normal display mode calculates display output data DD (m) for each of pixels of each of the segments 54 (*m*). In addition, the display control section 73 determines whether or not a pixel value DHD (m,i) of an i-th pixel of body image data DHD (m) is equal to or less than a shadow level Ls on the basis of shadow level information acquired from the data reading circuit 60. Then, if the pixel value DHD (m,i) is more than the shadow level Ls, the display control section 73 determines display output data DD (m,i) by acquiring multiplication data [DHD (m,i)×Rb (m)] as with the calculation during the normal display mode described above. Accordingly, there is determined the display output data DD (m,i) corresponding to normal brightness portions 37N (refer to FIG. 5 for the normal brightness portions) other than shadow portions 37S, in a display image based on the display output data DD (m).

Figure 18:
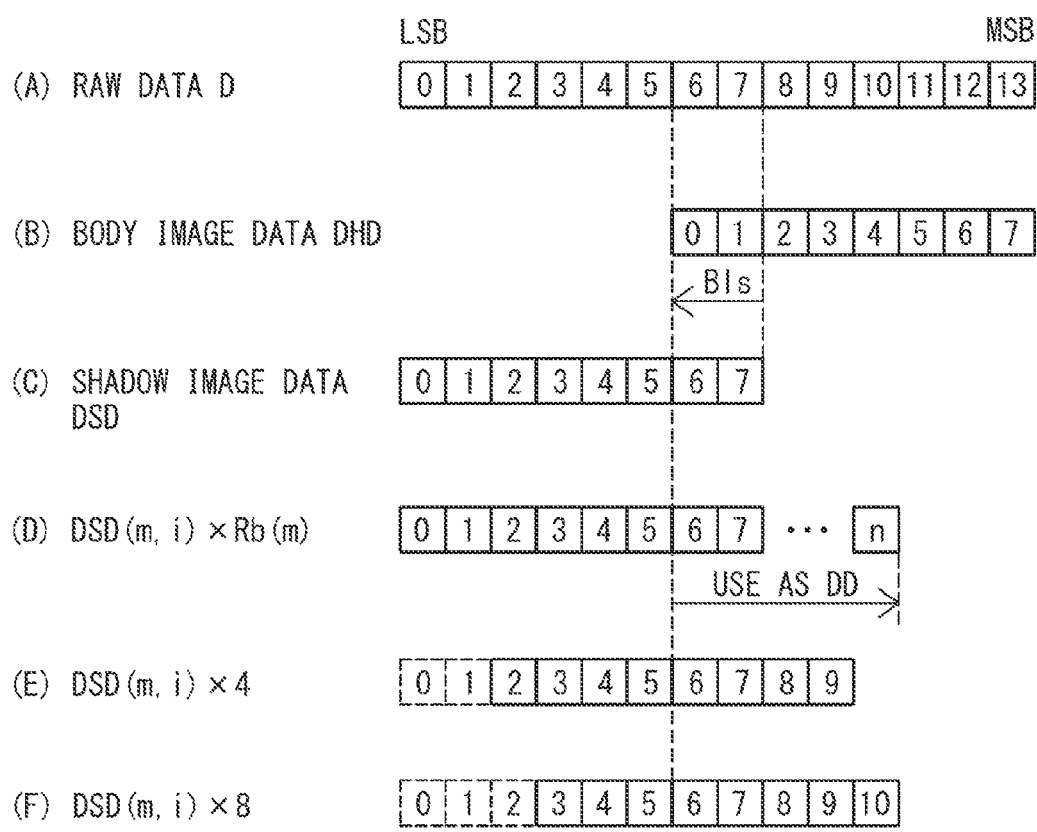
FIG. 18 is an illustration for describing processing of generating display output data at the time of an image quality improvement mode.

On the other hand, if the pixel value DHD (m,i) is equal to or less than the shadow level Ls, the display control section 73 extracts a pixel value DSD (m,i) of an i-th pixel corresponding to the pixel value DHD (m,i) from shadow image data DSD (m). Then, the display control section 73 calculates multiplication data by multiplying the pixel value DSD (m,i) by a light emission rate Rb (m), and selects the display output data DD (m,i) from the multiplication data. With reference to FIG. 18, the display output data DD (m,i) will be specifically described below.

FIG. 18 shows a portion (A) that is 14-bit RAW data D, a portion (B) that is 8-bit body image data DHD, and a portion (C) that is 8-bit shadow image data DSD. As shown in a portion (D) in FIG. 18, the display control section 73 acquires multiplication data [DSD (m,i)×Rb (m)] obtained by multiplying each of pixel values DSD (m,i) corresponding to respective pixel values DHD (m,i) equal to or less than the shadow level Ls by the light emission rate Rb (m), and selects predetermined higher-order bits from among the multiplication data, as the display output data DD (m,i).

As shown in a portion (E) in FIG. 18, in a case where the light emission rate Rb (m) is 4, for example, multiplication data [DSD (m,i)×Rb (m)] becomes a value obtained by multiplying each of the pixel values DSD (m,i) by 4, namely a value obtained by shifting each of the pixel values DSD (m,i) by 2 bits. Then, the display control section 73 selects higher-order 4 bits of multiplication data [DSD (m,i)×4] (here, the seventh bit from the least significant bit LSB and higher-order 4 bits from the seventh bit, or higher-order 4 bits up to the fourth bit from the most significant bit MSB), as the display output data DD (m,i).

In addition, as shown in a portion (F) in FIG. 18, in a case where the light emission rate Rb (m) is 8, for example, multiplication data [DSD (m,i)×Rb (m)] becomes a value obtained by multiplying each of the pixel values DSD (m,i) by 8, namely a value obtained by shifting each of the pixel values DSD (m,i) by 3 bits. Then, the display control section 73 selects higher-order 5 bits of multiplication data [DSD (m,i)× 8] (here, the seventh bit from the least significant bit LSB and higher-order 5 bits from the seventh bit, or higher-order 5 bits up to the fifth bit from the most significant bit MSB), as the display output data DD (m,i).

Further, in a case where the light emission rate Rb (m) is $2^P$ (P is a natural number of 0 or more) when a bit number of the shadow level Ls is indicated as a Bls (Bls is a natural number of 1 or more, and corresponds to "B" of the present invention), namely in a case where backlight brightness BL(m) becomes $\frac{1}{2^P}$ times the brightness setting maximum value, there is generated multiplication data obtained by multiplying each of the pixel values DSD (m,i) by $2^P$. Then, higher-order (Bls+P) bits of the multiplication data is selected as the display output data DD (m,i). Accordingly, there is selected display output data DD (m,i) corresponding to shadow portions 37S, in a display image based on the display output data DD (m).

The display control section 73 acquires display output data DD (m,i) for all pixels (i) in one of segments 54 (m) to acquire display output data DD (m) corresponding to the one of the segments 54 (m). Then, the display output data DD (m,i) selected from the higher-order (Bls+P) bits of the multiplication data [DSD (m,i)×Rb (m)] described above is mapped in the lower-order of the display output data DD (m). As a result, the shadow portions 37S corresponding to the lower-order (Bls) bits of the display output data DD (m) can be expressed with (Bls+P) bits. Accordingly, as the light emission rate Rb (m) increases (as the backlight brightness BL (m) decreases), the shadow portions 37S can be expressed with more bits.

(Operation of the Image File Display Device)

Figure 19:
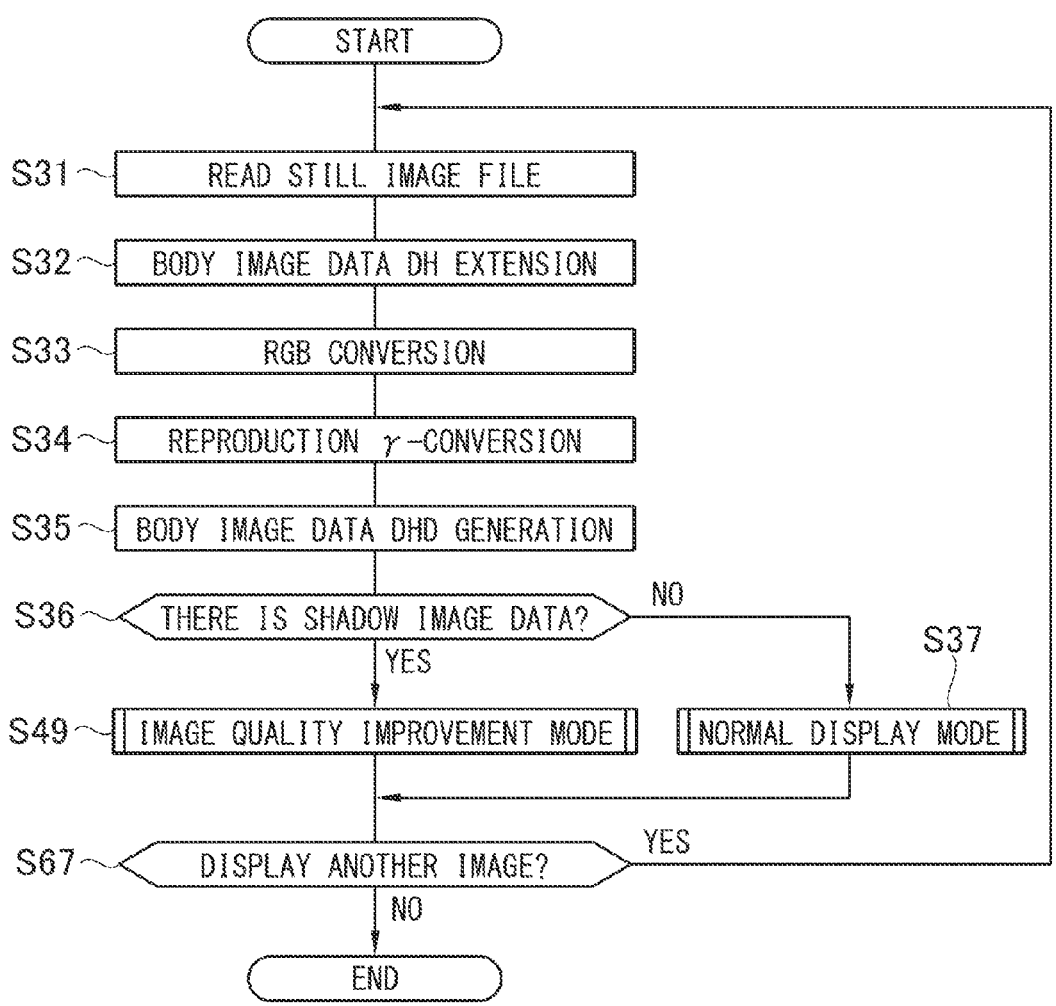
FIG. 19 is a flow chart showing a flow of processing of displaying a still image file by the image file display device.

Next, with reference to FIG. 19, image display processing of the display device 11 with the configuration described above will be described. After the memory card 10 in which the still image file 45 is recorded in the digital camera 2 described above is set into the card slot 59, and when an image display operation is performed in an operation section (not shown), the data reading circuit 60 reads out the still image file 45 from the memory card 10 (step S31).

In a case where the still image file 45 includes shadow image data DS, the data reading circuit 60 outputs body image data DH and the shadow image data DS to the first extension circuit 61 and the second extension circuit 64, respectively. In addition, the data reading circuit 60 reads out each of shadow level information Ls, γ, and γs, from a header of the still image file 45 to output the shadow level information, the γ, and the γs to the display processing circuit 67, the reproduction γ-conversion circuit 63, and the reproduction γs-conversion circuit 66, respectively.

On the other hand, in a case where the still image file 45 does not include shadow image data DS, the data reading circuit 60 outputs the body image data DH and the γ to the first extension circuit 61 and the reproduction γ-conversion circuit 63, respectively.

The first extension circuit 61 applies the JPEG extension to the body image data DH received from the data reading circuit 60, and outputs the body image data DH to the first RGB conversion circuit 62 (step S32). The first RGB conversion circuit 62 applies the RGB conversion processing to the body image data DH received from the first extension circuit 61, and then outputs the body image data DH to the reproduction γ-conversion circuit 63 (step S33).

The reproduction γ-conversion circuit 63 applies conversion processing using reproduction γ to the body image data DH received from the first RGB conversion circuit 62, on the basis of information on they received from the data reading circuit 60 to generate body image data DHD (steps S34 and S35). The body image data DHD is divided for each of the segments 54 (m) so that the reproduction γ-conversion circuit 63 outputs the body image data DHD (m) corresponding to each of the segments 54 (m) to the display processing circuit 67 in order.

(Normal Display Mode)

In a case where the still image file 45 does not include shadow image data DS, such a case where no shadow image data DSD (m) is received, and a case where a notice that there is no shadow image data DS is received from the data reading circuit 60, the display processing circuit 67 allows the display control section 73 to operate in the normal display mode (NO at step S36, and step S37).

Figure 20:
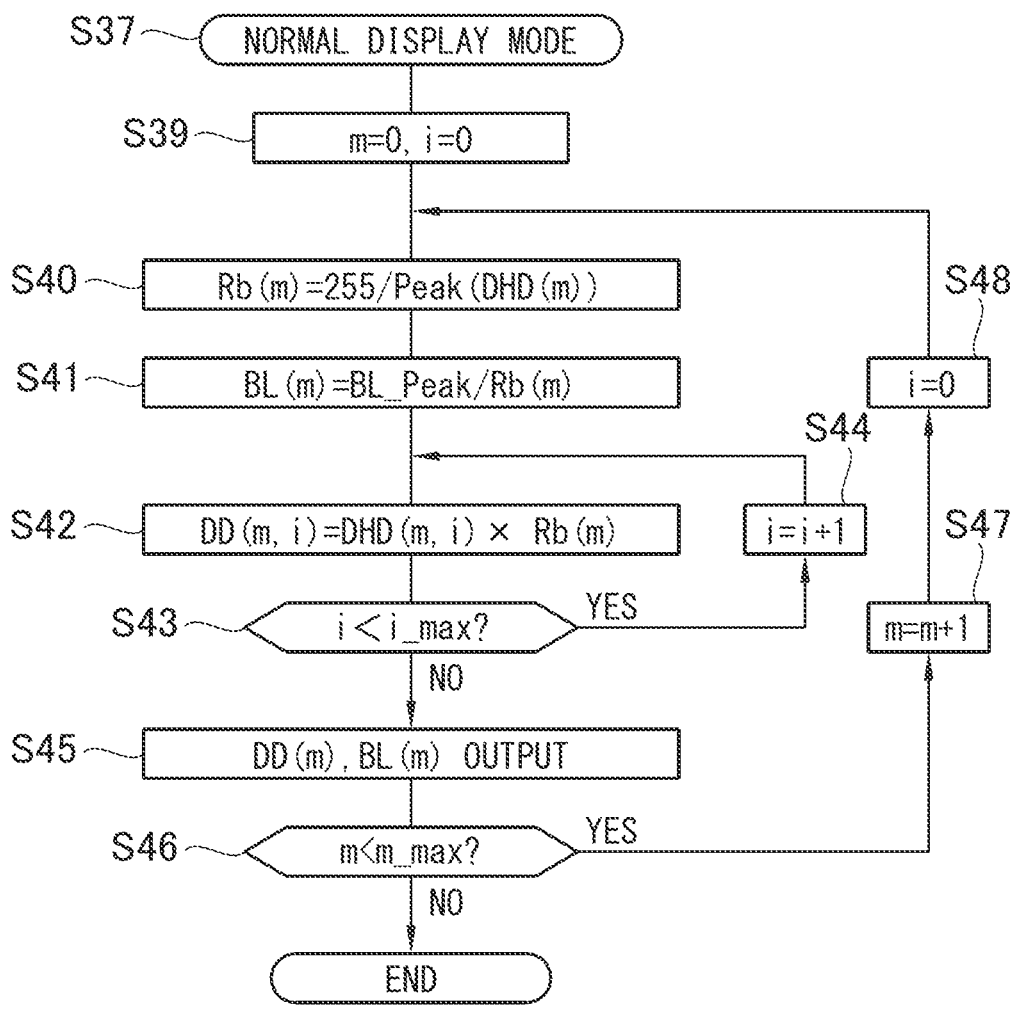
FIG. 20 is a flow chart showing a flow of processing of generating display output data at the time of the normal display mode.

As shown in FIG. 20, when receiving body image data DHD (0) corresponding to a 0-th segment 54 (0) from the reproduction γ-conversion circuit 63 (step S39), the light emission rate determination circuit 69 acquires a peak value "Peak (DHD (0))" of pixel values of the body image data DHD (0). Next, the light emission rate determination circuit 69 substitutes the acquired peak value "Peak (DHD (0))" into the expression (1) above to calculate a light emission rate Rb (0) of the segment 54 (0) (step S40). A calculation result of the light emission rate Rb (0) is inputted into the display device control unit 70.

The backlight control section 72 substitutes the light emission rate Rb (0) received from the light emission rate determination circuit 69 into the expression (2) above to calculate backlight brightness BL (0) of an illumination section 55 (0) corresponding to the segment 54 (0) (step S41).

Meanwhile, the display control section 73 during the normal display mode multiplies a pixel value DHD (0,0) of a 0-th pixel of the body image data DHD (0) received from the reproduction γ-conversion circuit 63 by the light emission rate Rb (0) received from the light emission rate determination circuit 69 (step S42). Accordingly, display output data DD (0,0) corresponding to the 0-th pixel of the segment 54 (0) is calculated. Next, the display control section 73 multiplies a pixel value DHD (0,1) of a first pixel of the body image data DHD (0) by the light emission rate Rb (0) to calculate the display output data DD (0,1) corresponding to the first pixel of the segment 54 (0) (YES at step S43, and steps S44 and S42). Likewise, the display control section 73 calculates display output data DD (0,i) for all pixels of the segment 54 (0).

Display output data DD (0,i) is calculated for all pixels (i=i_max) of the segment 54 (0) (NO at step S43), so that display output data DD (0) corresponding to the segment 54 (0) is acquired.

The backlight brightness BL (0) acquired by the backlight control section 72 is outputted to the backlight 53, and the display output data DD (0) acquired by the display control section 73 is outputted to the liquid crystal panel 52 (step S45).

Next, after the light emission rate determination circuit 69 calculates a light emission rate Rb (1), on the basis of body image data DHD (1) corresponding to a segment 54 (1) received by the display processing circuit 67 from the reproduction γ-conversion circuit 63, the backlight control section 72 and the display control section 73 calculate and output backlight brightness BL (1) and display output data DD (1), respectively (YES at step S46, and steps S47, S48, and S40 to S45).

Likewise, backlight brightness BL (m) and display output data DD (m), for all segments 54 (m) and illumination sections 55 (m) corresponding to all the segments 54 (m), are calculated and outputted (NO at step S46). Then, a display image is displayed on a screen of the liquid crystal panel 52.

(Image Quality Improvement Mode)

With reference to FIG. 19 again, in a case where the still image file 45 includes shadow image data DS, such a case where shadow image data DSD (m) is received, and a case where a notice that the shadow image data DS is outputted from the data reading circuit 60, the display processing circuit 67 allows the display control section 73 to operate in the image quality improvement mode (YES at step S36, and step S49).

Figure 21:
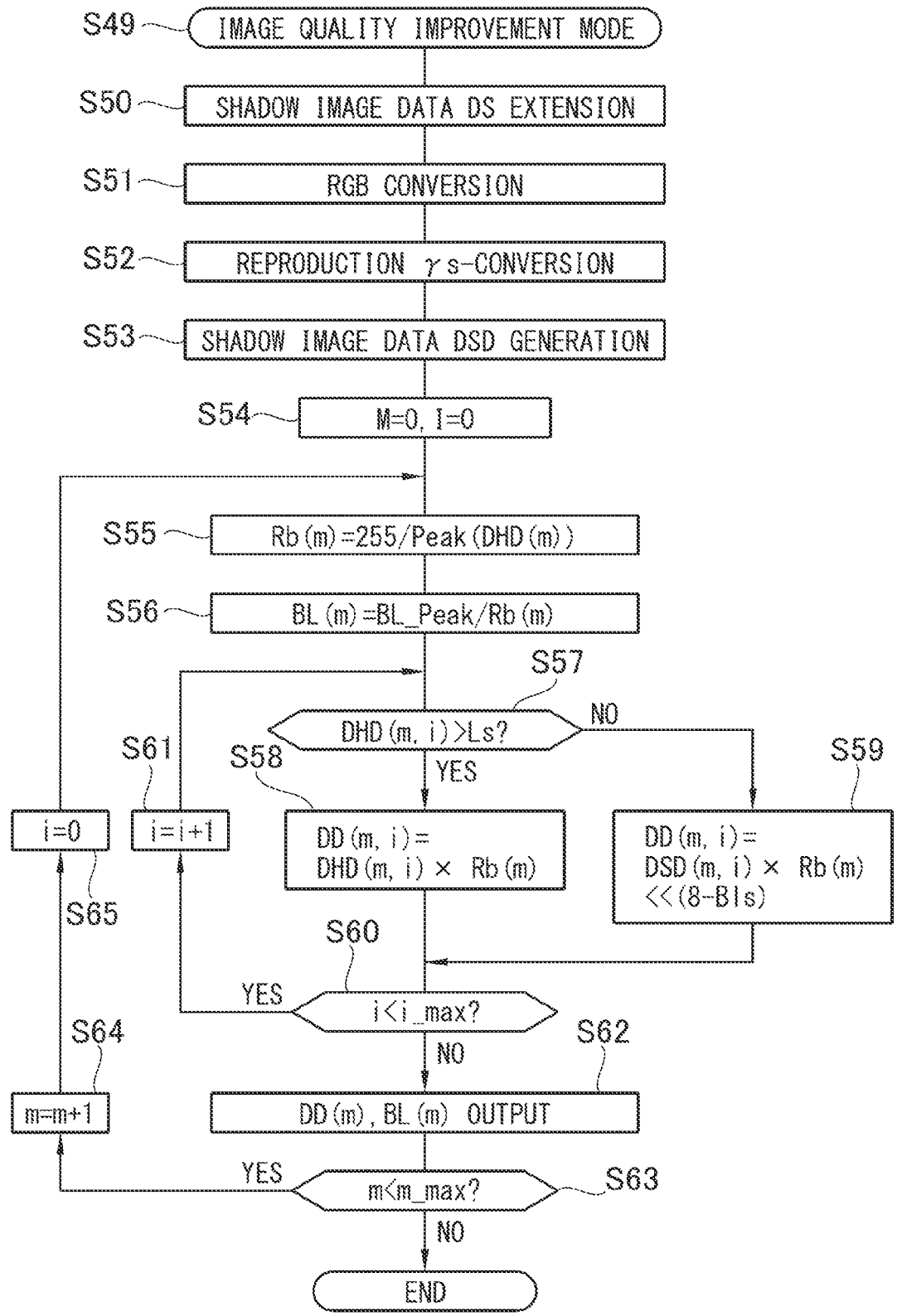
FIG. 21 is a flow chart showing a flow of processing of generating display output data at the time of the image quality improvement mode.

As shown in FIG. 21, in a case the still image file 45 includes the shadow image data DS, the second extension circuit 64 applies the JPEG extension to the shadow image data DS received from the data reading circuit 60, and outputs the shadow image data DS to the second RGB conversion circuit 65 (step S50). The second RGB conversion circuit 65 applies the RGB conversion processing to the shadow image data DS received from the second extension circuit 64, and then outputs the shadow image data DS to the reproduction γs-conversion circuit 66 (step S51).

The reproduction γs-conversion circuit 66 applies conversion processing using reproduction γs to the shadow image data DS received from the second RGB conversion circuit 65, on the basis of information on the γs received from the data reading circuit 60 to generate shadow image data DSD (steps S52 and S53). The shadow image data DSD is divided for each of the segments 54 (m) so that the reproduction γs-conversion circuit 66 outputs the shadow image data DSD (m) corresponding to each of the segments 54 (m) to the display processing circuit 67 in order. The processing from step S50 to step S53 is performed in parallel with the processing from step S32 to step S35, described above.

Next, as with steps S39 to S41 described above, after the light emission rate determination circuit 69 calculates the light emission rate Rb (0), and outputs the light emission rate Rb (0) to the display device control unit 70 (steps S54 and S55), the backlight control section 72 calculates backlight brightness BL(0) (step S56).

Meanwhile, the display control section 73 during the image quality improvement mode determines whether or not i=0-th pixel value DHD (0,0) of body image data DHD (0) received from the reproduction γ-conversion circuit 63 is equal to or less than a shadow level Ls, on the basis of shadow level information acquired from the data reading circuit 60 (step S57).

If the pixel value DHD (0,0) is more than the shadow level Ls (YES at step S57), the display control section 73 calculates multiplication data [DHD (0,0)×Rb (0)] by multiplying the pixel value DHD (0,0) by the light emission rate Rb (0), as with step S42 of the normal display mode described above (step S58).

On the other hand, if the pixel value DHD (0,0) is equal to or less than the shadow level Ls (NO at step S57), the display control section 73 extracts a pixel value DSD (0,0) of the 0-th pixel corresponding to the pixel value DHD (0,0) from shadow image data DSD (0). Then, the display control section 73 calculates multiplication data [DSD (0,0)×Rb (0)] by multiplying the pixel value DSD (0,0) by the light emission rate Rb (m) (step S59).

Next, the display control section 73 determines whether or not a pixel value DHD (0,1) of a first pixel of the body image data DHD (0) is equal to or less than the shadow level Ls (YES at step S60, and steps S61 and S57). Then, if the pixel value DHD (0,1) is more than the shadow level Ls, the display control section 73 calculates multiplication data [DSD (0,1)×Rb (0)] (YES at step S57, and step S58). In addition, if the pixel value DHD (0,1) is equal to or less than the shadow level Ls, the display control section 73 calculates multiplication data [DSD (0,1)×Rb (0)] (NO at step S57, and step S59).

Likewise, the display control section 73 calculates the multiplication data [DI-ID (0,i)×Rb (0)] or the multiplication data [DSD (0,i)×Rb (0)] for all pixels (i=i_max) of a segment 54 (0) (NO at step S60).

The display control section 73 indicates the multiplication data [DHD (0,i)×Rb (0)] as display output data DD (0,i) corresponding to normal brightness portions 37N. In addition, the display control section 73 selects higher-order predetermined bits of the multiplication data [DSD (0,i)×Rb (0)], such as higher-order 4 bits in a case where the Ls is 3 (Bls is 2), and the light emission rate Rb (0) is 4, as display output data DD (0,i) corresponding to shadow portions 37S. The higher-order 4 bits are mapped in lower-order of the display output data DD (0). Accordingly, 8-bit display output data DD (0) corresponding to the segment 54 (0) is acquired.

The backlight brightness BL (0) acquired by the backlight control section 72 is outputted to the backlight 53, and the display output data DD (0) acquired by the display control section 73 is outputted to the liquid crystal panel 52 (step S62).

Next, the light emission rate determination circuit 69 calculates a light emission rate Rb (1), on the basis of body image data DHD (1) corresponding to a segment 54 (1), received from the reproduction γ-conversion circuit 63 (YES at step S63, and steps S64, S65, and S55). Then, as described in steps S56 to S62 above, the backlight control section 72 and the display control section 73 calculate and output the backlight brightness BL (1) and the display output data DD (1), respectively. Likewise, backlight brightness BL (m) and display output data DD (m), for all segments 54 (m) and illumination sections 55 (m) corresponding to all the segments 54 (m), are calculated and outputted.

Backlight brightness BL (m) and display output data DD (m), for all segments 54 (m=m_max) and illumination sections 55 (m=m_max) corresponding to all the segments 54, are calculated and outputted (NO at step S63), so that an image is displayed on a screen of the liquid crystal panel 52.

With reference to FIG. 19 again, in a case where another still image file 45 recorded in the memory card 10 is reproduced and displayed, each of the processing steps described above is repeatedly performed (step S67) to allow a new image to be displayed on the screen of the liquid crystal panel 52.

(Operation Effect of an Image File Display Device)

Figure 22A:
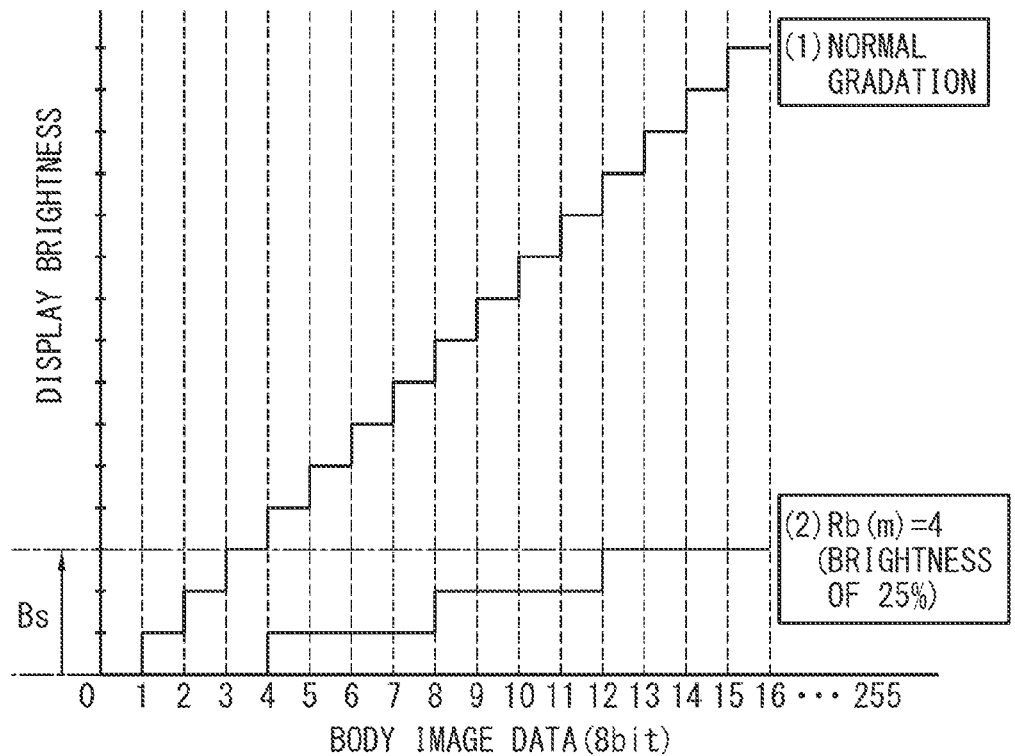
FIG. 22A is an illustration for describing a multi-gradation display of shadow portions performed by using shadow image data.

In FIG. 22A showing a comparative example, in contrast with normal gradation (1) in which 8-bit body image data DHD is normally (a light emission rate Rb (m) of 1, and brightness of 100%) displayed, in a case where a light emission rate Rb (m) of 4, or 25% (¼ times) of backlight brightness BL (m), is applied, values 0 to 3 of body image data are conventionally quadrupled to display a portion at brightness 0 to a portion at a shadow brightness level Bs. That is, a value 4 is applied to display a portion at brightness corresponding to a value 1 of the body image data at gradation (2), and a value 8 is applied to display a portion at brightness corresponding to a value 2 of the body image data at the gradation (2). In this case, there is no intermediate gradation between values 1 and 4, and between values 4 and 8, of the body image data. Thus, display gradation at the gradation (2) is 4-gradation as with the normal gradation (1).

Figure 22B:
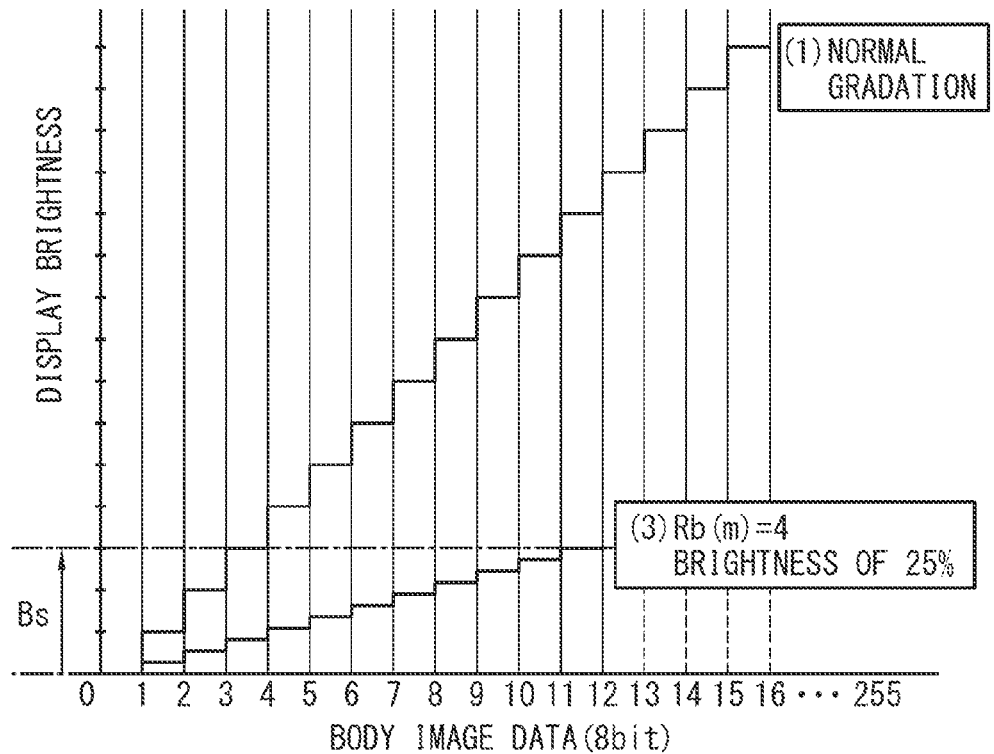
FIG. 22B is an illustration for describing the multi-gradation display of shadow portions performed by using shadow image data.

On the other hand, as shown in FIG. 22B, higher-order 4 bits (Bls=2) of shadow image data recorded separately is used for display in the present invention, so that it is possible to display shadow portions 37S at brightness 0 to shadow brightness level Bs at maximum 14-gradation (12-gradation in FIG. 22B), as shown in gradation (3). In addition, in a case where a light emission rate Rb (m) of 64, or ¹⁄₆₄ times backlight brightness BL (m), is applied, higher-order 8 bits of the shadow image data is used for display to enable multi-gradation display. Accordingly, it is possible to display the shadow portions 37S at sufficient gradation.

Figure 23:
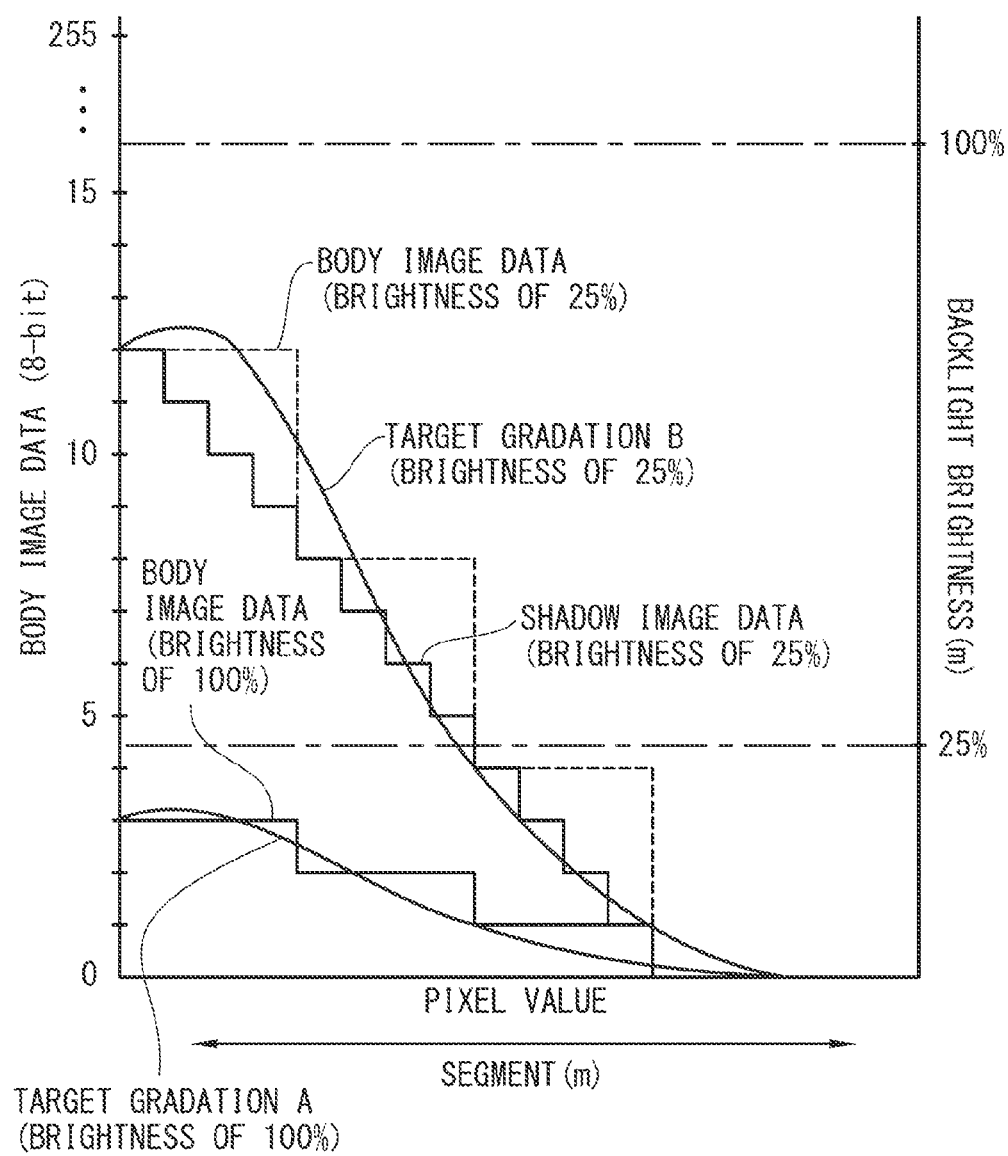
FIG. 23 is another illustration for describing the multi-gradation display of shadow portions performed by using shadow image data.

Likewise, in FIG. 23 showing relationship between a pixel value and backlight brightness in a segment 54 (m), if a portion with a pixel value equal to or less than a shadow level Ls is conventionally displayed, the portion is displayed at 4 values close to target gradation A (4-gradation), and the backlight brightness is set at 100%. In a case where the backlight brightness is set at 25%, a value of body image data is quadrupled and displayed at 4 values (4-gradation) close to target gradation B in a conventional method, however, display at 4-gradation is not changed. On the other hand, in the present invention, the higher-order 4 bits (Bls=2) of the shadow image data are used for display, so that it is possible to display the shadow portions 37S at maximum 16-gradation to enable a shadow portion to be displayed at sufficient gradation (multi-bit).

In addition, in a segment 54 (m) in which a peak value of pixel values is relatively small, it is possible to reduce backlight brightness on the basis of the expressions (1) and (2) above, so that power can be saved.

(A Digital Camera of a Third Embodiment)

Figure 24:
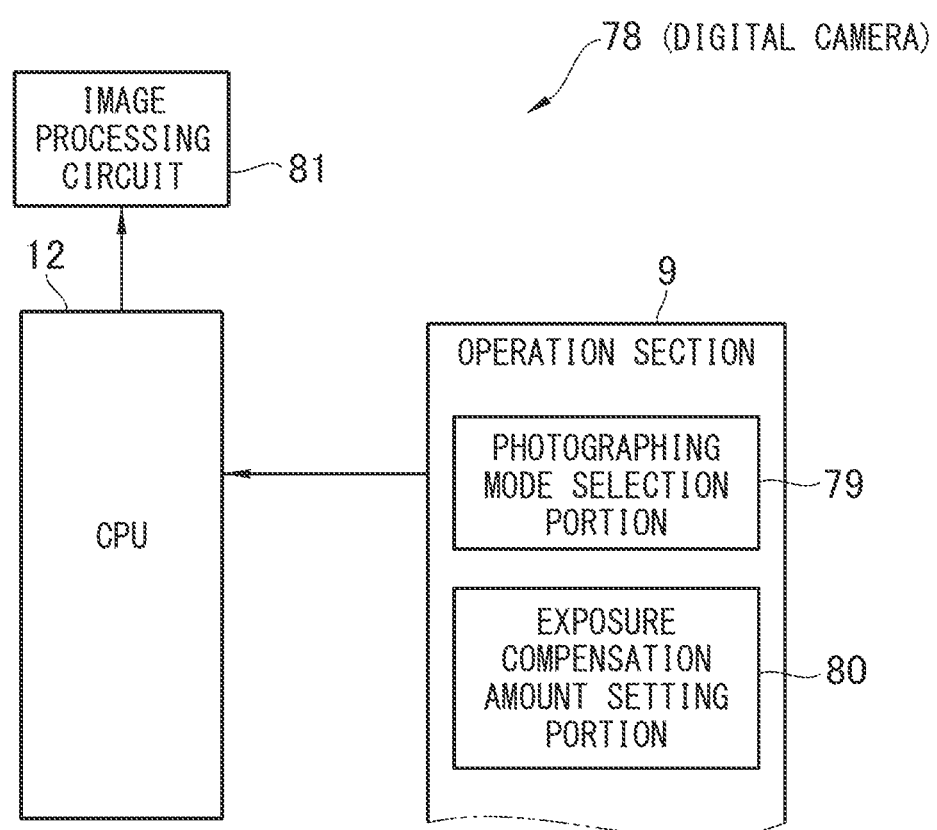
FIG. 24 is a block diagram showing an electrical configuration of a digital camera of a third embodiment.

Next, with reference to FIG. 24, a digital camera 78 of a third embodiment of the present invention will be described. The digital camera 2 of the first embodiment described above generates and records shadow image data DS when a pixel number of low brightness pixels (i) (ΣS shown in FIG. 12) constituting shadow portions 37S is more than a threshold value SS. On the other hand, the digital camera 78 generates and records shadow image data DS when a specific photographing mode is selected, or a specific photographing setting value is set, in the operation section 9.

The digital camera 78 has a configuration that is basically identical with that of the digital camera 2 of the first embodiment except selecting a photographing mode and setting a photographing setting value. Thus, with reference to a component identical with that of the first embodiment above in a function and a configuration, a description of the component is omitted by using the same reference numeral as that of the first embodiment.

The operation section 9 of the digital camera 78 includes a photographing mode selection portion (photographing mode selection device) 79, and an exposure compensation amount setting portion (setting device) 80.

The photographing mode selection portion 79 is used to select a photographing mode of the digital camera 78. The photographing mode of the digital camera 78 includes a night scene mode set at a photographing condition optimum for photographing a night scene other than a normal photographing mode, and each of the photographing modes is selected in the photographing mode selection portion 79. In a case where the night scene mode is set as a photographing mode, the CPU 12 increases sensitivity of the color imaging element 23, and reduces a shutter speed of the mechanical shutter 18 to increase exposure amount, and so on.

The exposure compensation amount setting portion 80 is used to set exposure compensation amount (a photographing setting value) during photographing. The CPU 12 adjusts a shutter speed of the mechanical shutter 18, and an aperture of a diaphragm in accordance with the exposure compensation amount set in the exposure compensation amount setting portion 80 to increase and reduce exposure during the photographing.

Although an image processing circuit 81 has a configuration that is basically identical with that of the image processing circuit 29 of the first embodiment shown in FIG. 4, the image processing circuit 81 generates and records shadow image data DS when an operation is performed in the operation section 9 so that a pixel number of low brightness pixels (i) increases, and does not generate and record the shadow image data DS when the operation is not performed. The operation of increasing a pixel number of low brightness pixels (i) includes an operation of selecting the night scene mode as a photographing mode, and an operation of setting a negative amount of exposure compensation amount at a predetermined amount or more (within a predetermined range). Here, the "predetermined amount" is appropriately determined by acquiring a pixel number of low brightness pixels (i) when the negative amount of exposure compensation amount is increased and reduced by experiment or simulation.

(Operation of the Digital Camera of the Third Embodiment)

Figure 25:
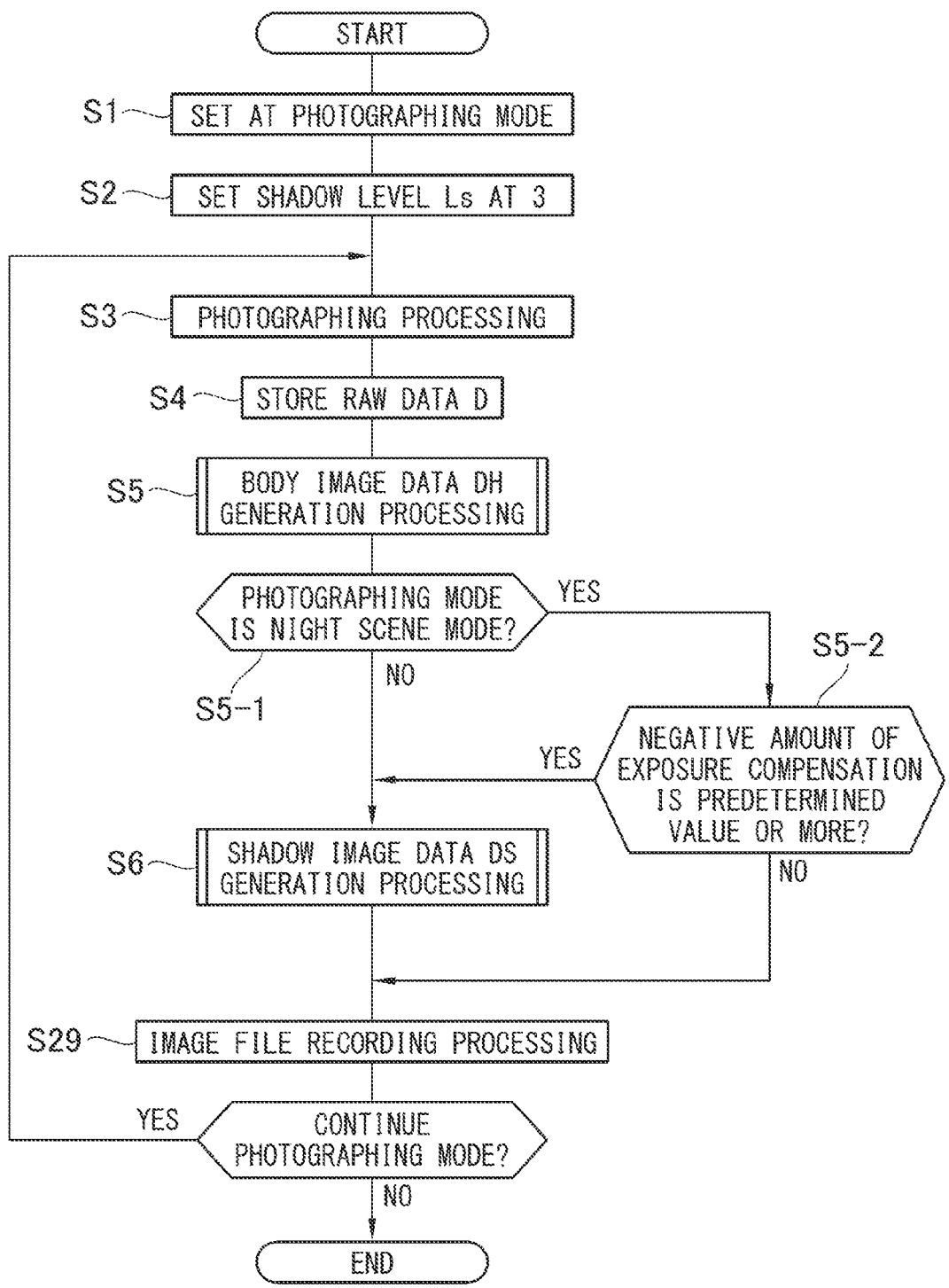
FIG. 25 is a flow chart showing a flow of processing of generating and recording a still image file of the third embodiment.

With reference to FIG. 25, an operation of the digital camera 78 having the configuration described above (processing of generating and recording a still image file 45) will be described. Since the processing of each of steps S1 to S5 is identical with each processing of the first embodiment shown in FIGS. 10 and 11, hereinafter a description of the processing is omitted.

Figure 10:
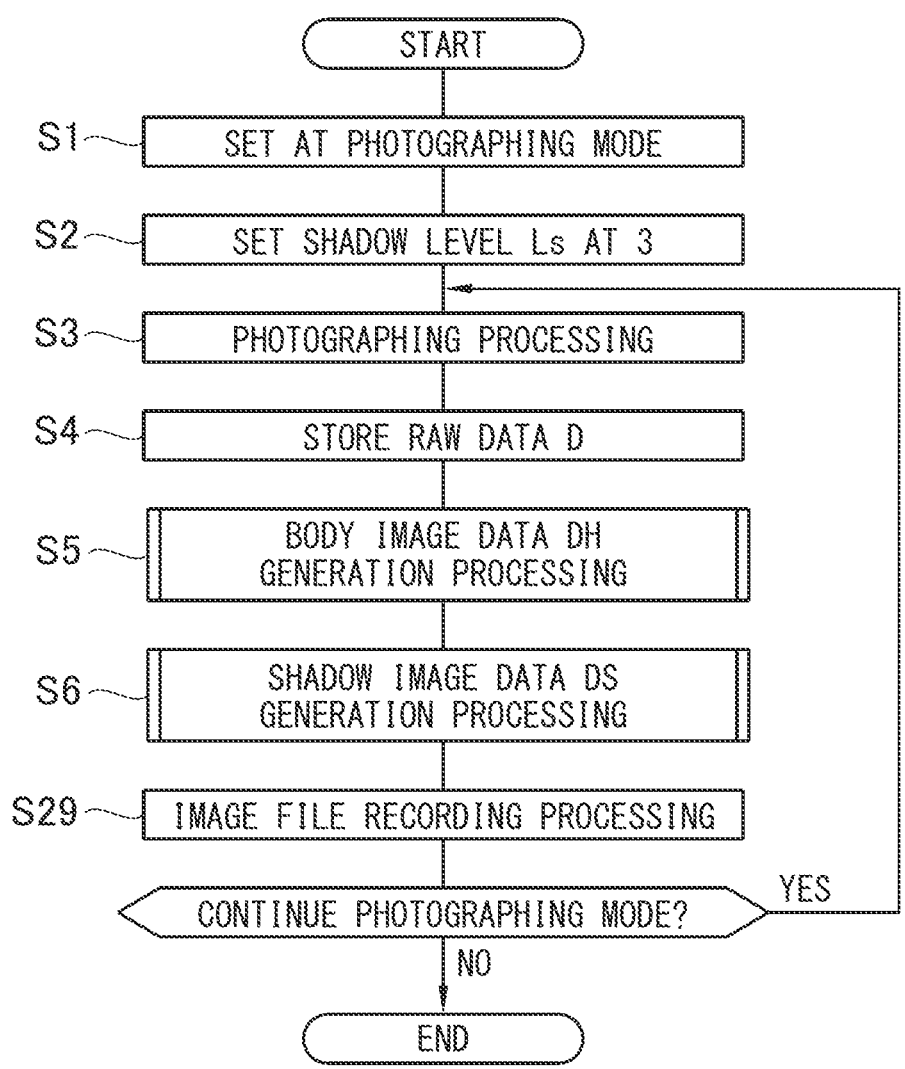
FIG. 10 is a flow chart showing a flow of processing of generating and recording a still image file of the digital camera.

The image processing circuit 81 (shadow image generation processing section 29b) performs the processing of generating shadow image data DS (step S6) shown in FIG. 12 and the processing of recording the still image file 45 (step S29) shown in FIG. 10, described above, in a case where the night scene mode is set in the photographing mode selection portion 79 (step S5-1), or in a case where a negative amount of exposure compensation amount set in the exposure compensation amount setting portion 80 is equal to or more than a predetermined amount (step S5-2).

In addition, the image processing circuit 81 does not generate the shadow image data DS in a case where the night scene mode is not set, and the negative amount of exposure compensation amount is less than the predetermined amount.

In this case, body image data DH and γ are recorded in the memory card 10 as the still image file 45.

(Operation Effect of the Third Embodiment)

As above, in the digital camera 78 of the third embodiment, it is possible to record the shadow image data DS in a case where an increase in a pixel number of low brightness pixels (i) (an area of shadow portions 37S) allows an effect of multi-gradation display of the shadow portions 37S by using the shadow image data DS to be remarkable. In addition, unnecessary shadow image data DS in which a ratio of the shadow portions 37S is low is prevented from being recorded.

In the third embodiment described above, although the night scene mode and the exposure compensation amount are described as an example of a photographing mode having high possibility that a pixel number of low brightness pixels (i) increases, and an example of a photographing setting value, respectively, the present invention is also applicable to a case where various photographing modes having possibility that the pixel number increases are selected, or a case where various photographing setting values are set.

(A Digital Camera of a Fourth Embodiment)

Figure 26:
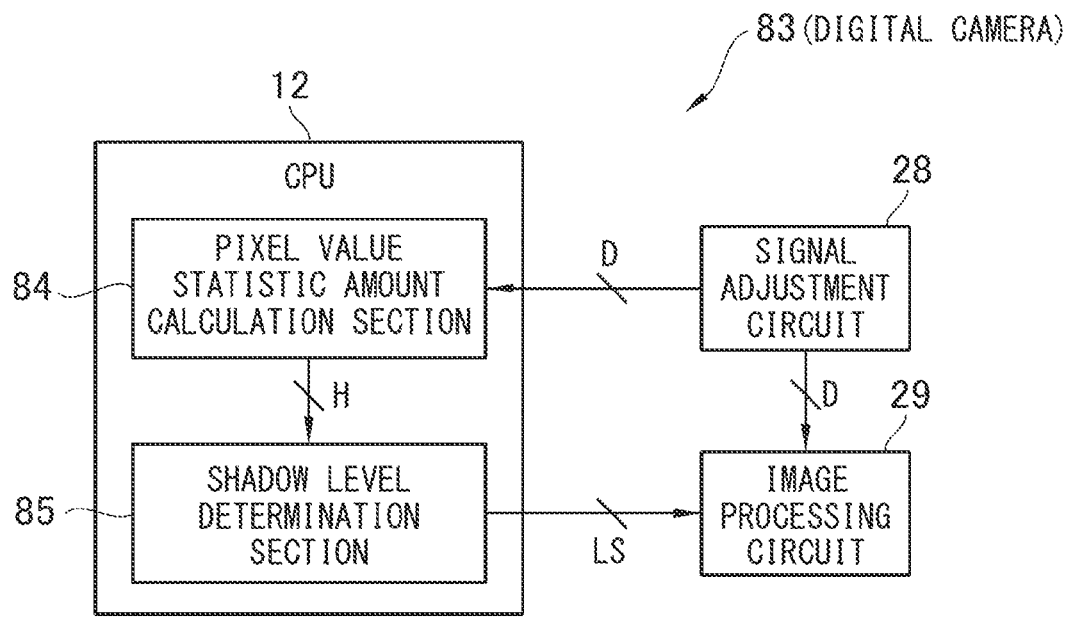
FIG. 26 is a block diagram showing an electrical configuration of a digital camera of a fourth embodiment.

Next, with reference to FIG. 26, a digital camera 83 of a fifth embodiment of the present invention will be described. While the digital cameras 2 and 78 of the first and third embodiments described above select a low brightness pixel (i) in accordance with a predetermined shadow level Ls regardless of RAW data D, the digital camera 83 determines the shadow level Ls for each of RAW data D.

The digital camera 83 has a configuration that is basically identical with that of the digital camera 2 of the first embodiment except that a CPU 12 of the digital camera 83 serves as a pixel value statistic amount calculation section (pixel value statistic amount calculation device) 84, and a shadow level determination section (brightness level determination device) 85. Thus, with reference to a component identical with that of the first embodiment above in a function and a configuration, a description of the component is omitted by using the same reference numeral as that of the first embodiment.

The pixel value statistic amount calculation section 84 acquires RAW data D generated by the signal adjustment circuit 28, and calculates a histogram H on the basis of a pixel value D (i) of each of pixels (i) of the RAW data D, as a statistic amount of the pixel value D (i) of each of the pixels (i).

Figure 27:
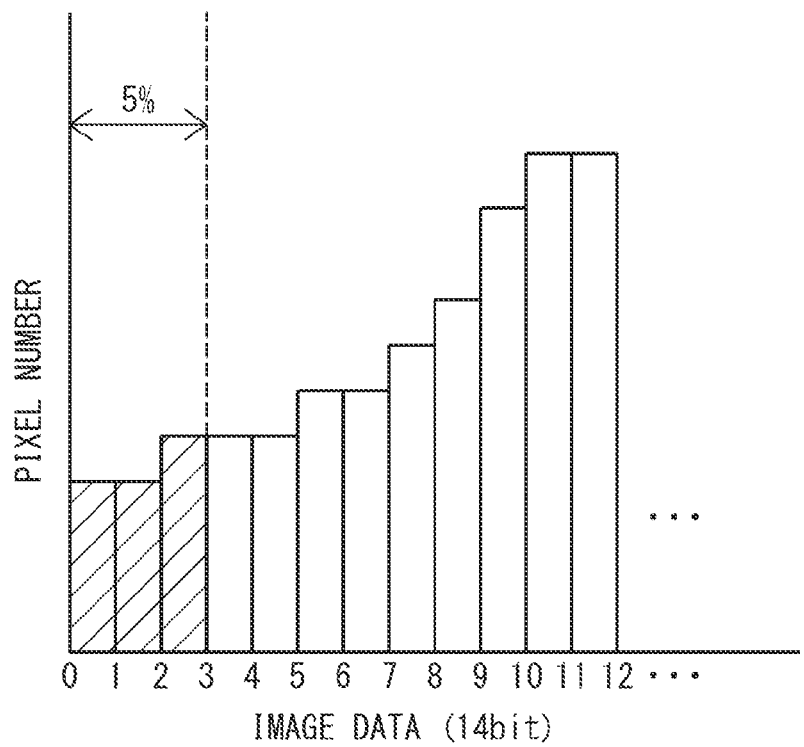
FIG. 27 is an illustration for describing a histogram calculated by a pixel value statistic amount calculation section.

As shown in FIG. 27, the histogram H shows a relationship between pixel values (0 to $(2^{14}-1)$) and a pixel number for each of the pixel values. Analyzing the histogram H enables a pixel number of pixels (i) equal to or less than an arbitrary pixel value in the RAW data D to be determined. The histogram H is outputted to the shadow level determination section 85.

The shadow level determination section 85 analyzes the histogram H received from the pixel value statistic amount calculation section 84 to determine a shadow level Ls at which pixels in a predetermined ratio (such as 5%) can be selected in the RAW data D as low brightness pixels (i). Then, the shadow level determination section 85 outputs shadow level information on the determined shadow level Ls to the image processing circuit 29.

The image processing circuit 29 selects low brightness pixels (i) in accordance with the shadow level Ls determined by the shadow level determination section 85 to generate shadow image data DS. Accordingly, it is possible to generate the shadow image data DS corresponding to a brightness level of shadow portions 37S included in RAW data D and a ratio (frequency) of the shadow portions for each of RAW data items.

In the fifth embodiment described above, although the histogram H is calculated as the statistic amount of the pixel value D (i) of each of the pixels (i) of the RAW data D, various statistic amounts capable of determining a relationship between pixel values and a pixel number for each of the pixel values may be calculated.

(An Image File Display Device of a Fifth Embodiment)

Figure 28:
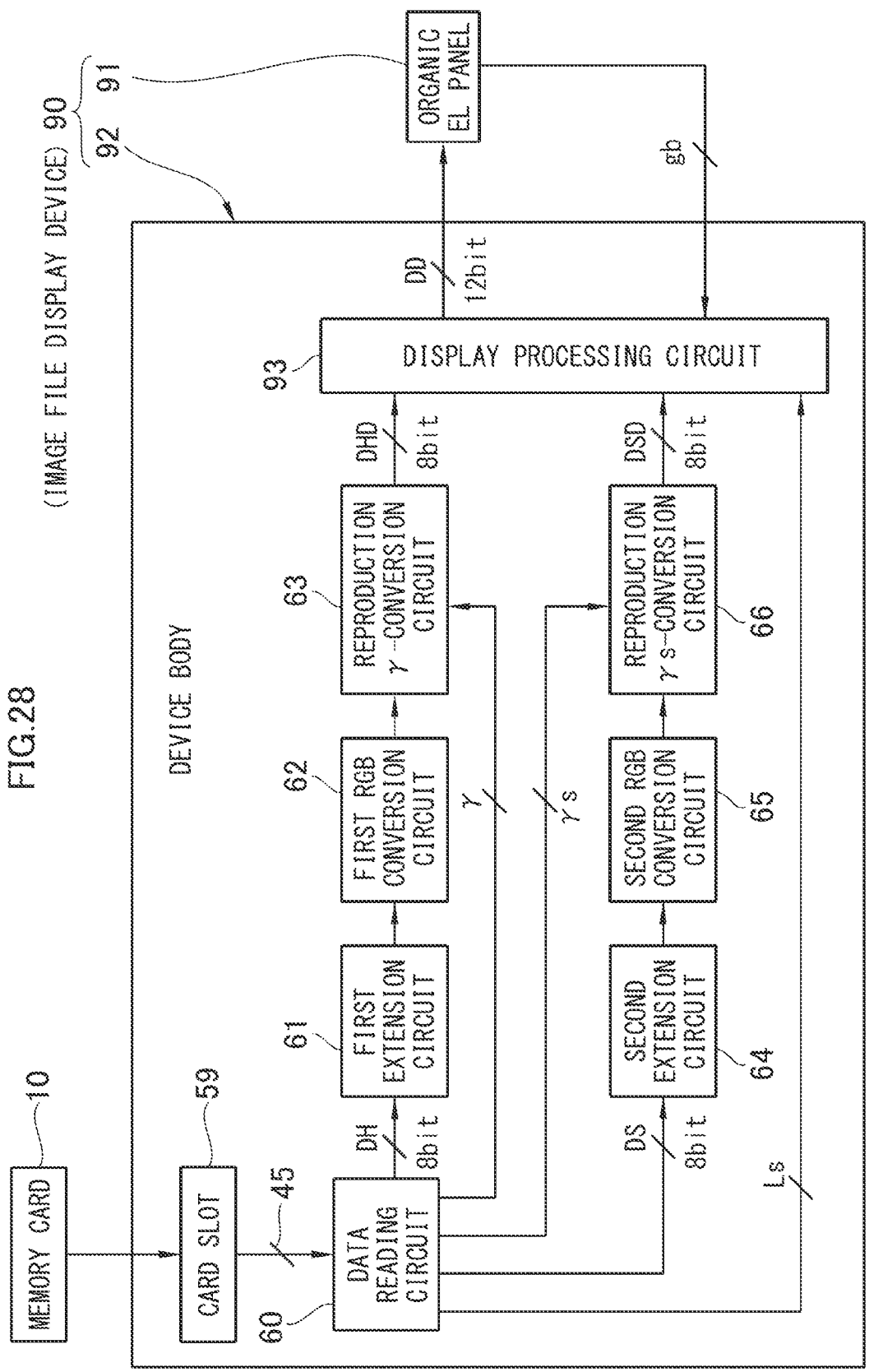
FIG. 28 is a block diagram showing an electrical configuration of an image file display device of a fifth embodiment.

Next, with reference to FIG. 28, the image file display device 90 of the fifth embodiment of the present invention (hereinafter referred to simply as a display device 90) will be described. While the display device 11 of the second embodiment described above allows the liquid crystal display device 50 capable of local dimming control to perform image display based on the still image file 45, the display device 90 uses a display device capable of multi-gradation display other than a liquid crystal display device to perform image display based on the still image file 45.

The display device 90 is composed of an organic EL panel (display device) 91 capable of 12-bit gradation display, and a device body 92. Since a structure of the organic EL panel 91 is well-known, hereinafter a specific description thereof is omitted.

The display device 90 has a configuration that is basically identical with that of the display device 11 of the second embodiment except that the display device 90 includes the organic EL panel 91 instead of the liquid crystal display device 50. Thus, with reference to a component identical with that of the second embodiment above in a function and a configuration, a description of the component is omitted by using the same reference numeral as that of the second embodiment.

Although the device body 92 has a configuration that is basically identical with that of the device body 51 of the second embodiment except that the device body 92 includes a display processing circuit 93 different from the display processing circuit 67 of the second embodiment above, the device body 92 includes the reproduction γ-conversion circuit 63 that outputs body image data DHD to the display processing circuit 93, and the reproduction γs-conversion circuit 66 that outputs shadow image data DSD to the display processing circuit 93.

Figure 29:
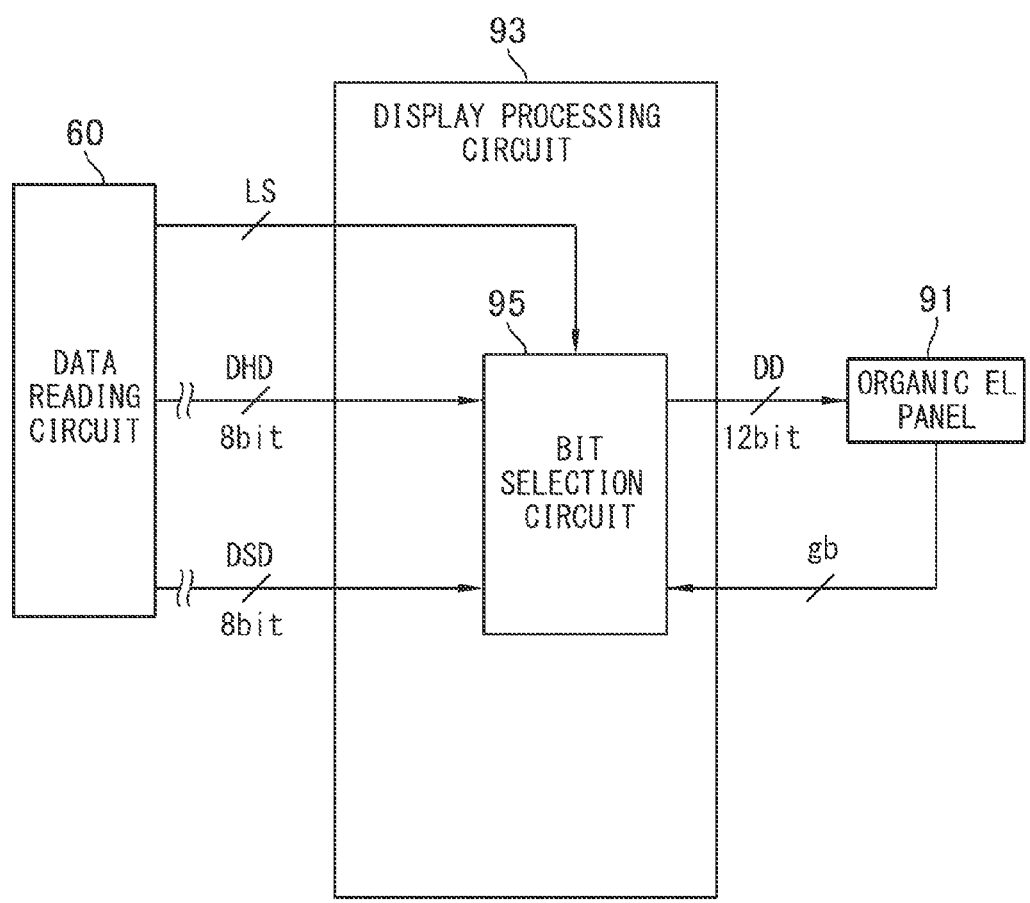
FIG. 29 is a block diagram showing an electrical configuration of a display processing circuit of the fifth embodiment.

As shown in FIG. 29, the display processing circuit 93 includes a bit selection circuit 95. The bit selection circuit 95 generates 12-bit display output data DD on the basis of gradation information gb (such as 12-bit) acquired from the organic EL panel 91, and input data and information (8-bit image data DHD and DSD, and shadow level information) from each of the circuits 60, 63, and 66, and outputs the display output data DD to the organic EL panel 91. Then, the bit selection circuit 95 determines the display output data DD for each of pixels (i) of the organic EL panel 91.

As with the display control section 73 of the second embodiment, the bit selection circuit 95 operates in the normal display mode in a case where the still image file 45 does not include shadow image data DS, and operates in the image quality improvement mode in a case where the still image file 45 includes the shadow image data DS.

(Operation of the Bit Selection Circuit During the Normal Display Mode)

Figure 30:
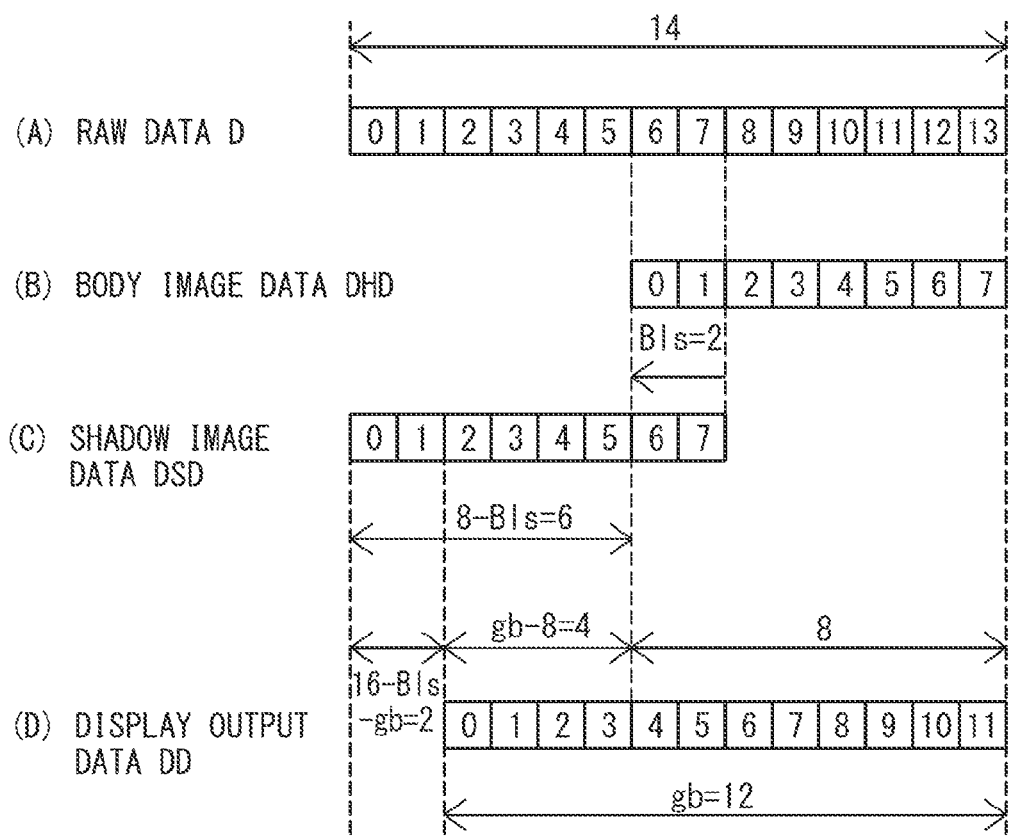
FIG. 30 is an illustration for describing processing of generating display output data.

Portions (A) to (D) of FIG. 30 specifically describe an operation of the bit selection circuit 95 in the following conditions: RAW data D is 14-bit; body image data DHD and shadow image data DSD are 8-bit; display output data DD includes 12-bit gb; and a bit number of a shadow level Ls (Bls) is 2.

The bit selection circuit 95 in the normal display mode determines whether display gradation of the organic EL panel 91 is 12-bit on the basis of the gradation information gb acquired from the organic EL panel 91. Then, the bit selection circuit 95 assigns a 8-bit pixel value DHD (i) of an i-th (i=0 to ($2^{12}$−1)) pixel of the body image data DHD to higher-order 8 bits [DD (i,5) to DD (i,12)] of i pixels of a 12-bit display output data DD. In addition, the bit selection circuit 95 inserts 0 to lower-order 4 bits [DD (i,0) to DD (i,4)] of an i-th pixel of the display output data DD. "DD (i,b)" indicates a b-th bit of an i-th pixel of the display output data DD. Accordingly, 12-bit display output data DD is generated.

(Operation of the Bit Selection Circuit During the Image Quality Improvement Mode)

The bit selection circuit 95 in the image quality improvement mode determines whether or not a pixel value DHD (i) of an i-th pixel of body image data DHD is equal to or less than a shadow level Ls after determining whether display gradation of the organic EL panel 91 is 12-bit, as with the bit selection circuit 95 during the normal display mode. Then, if the pixel value DHD (i) of the i-th pixel of the body image data DHD is more than the shadow level Ls, the bit selection circuit 95 assigns the pixel value DHD (1) to higher-order 8 bits [DD (i,5) to DD (i,12)] of the i-th pixel of the display output data DD, as with the bit selection circuit 95 during the normal display mode. In addition, the bit selection circuit 95 inserts 0 to lower-order 4 bits [DD (i,0) to DD (i,4)].

On the other hand, if the pixel value DHD (i) of the i-th pixel of the body image data DHD is equal to or less than the shadow level Ls, the bit selection circuit 95 assigns the pixel value DHD (i) of the i-th pixel to the higher-order 8 bits [DD (i,5) to DD (i,12)] of the i-th pixel of the display output data DD, and then normally "0" is to be inserted.

In addition, the bit selection circuit 95 assigns 4 (=gb−8) bits below higher-order 3 bits of a 8-bit pixel value DSD (i) of an i-th pixel of shadow image data DSD, specifically from a third bit "5" to a sixth bit "2" in the higher-order, to lower-order 8 bits [DD (i,0) to DD (i,3)] of the i-th pixel of the display output data DD. Accordingly, 12-bit display output data DD is generated.

The organic EL panel 91 displays an image on the screen on the basis of the 12-bit display output data DD received from the bit selection circuit 95.

(Operation of the Image File Display Device of the Fifth Embodiment)

Figure 31:
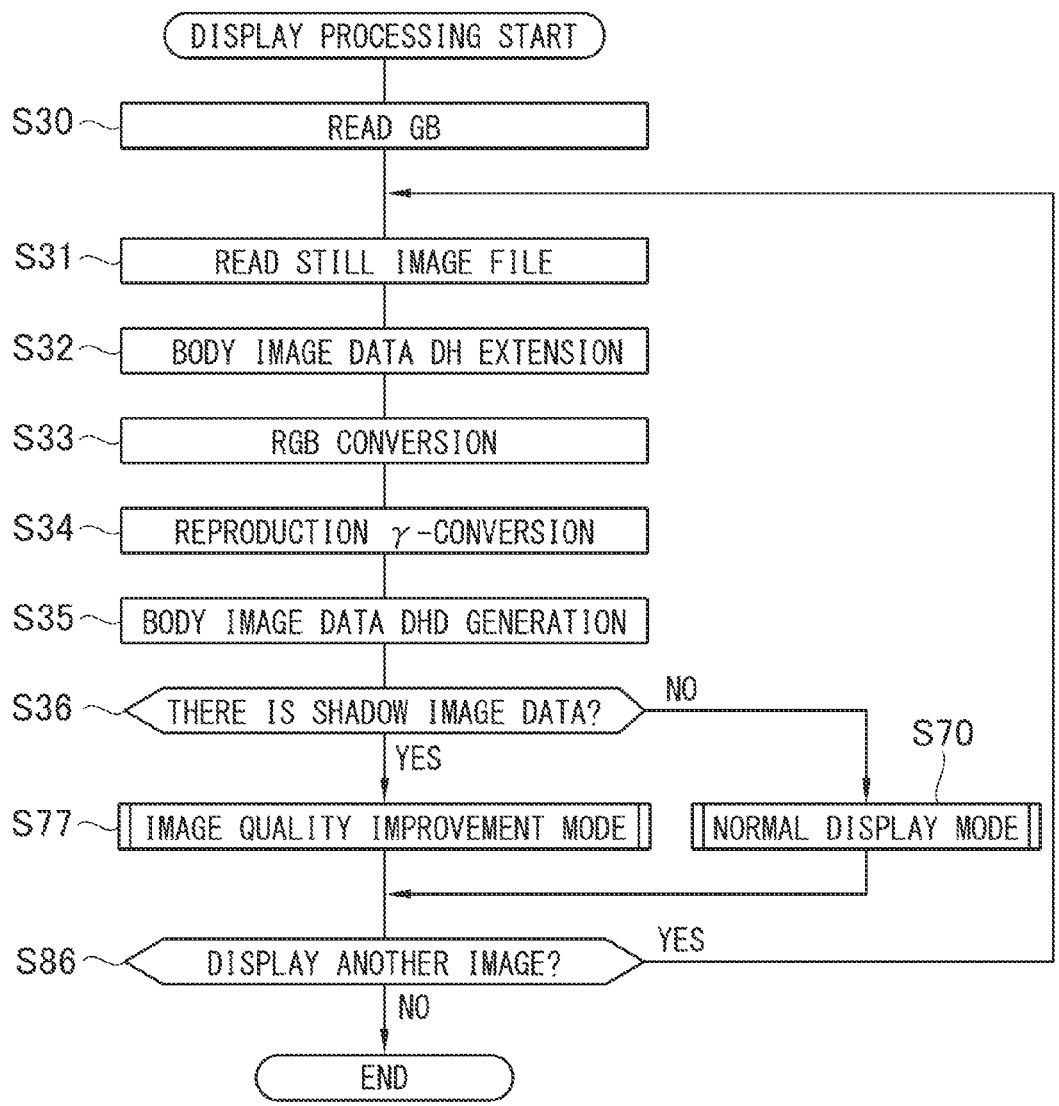
FIG. 31 is a flow chart showing a flow of processing of displaying a still image file by an image file display device of the fifth embodiment.

Next, with reference to FIG. 31, image display processing of the display device 90 with the configuration described above will be described. When a power source of the display device 90 is turned on, the display processing circuit 93 (bit selection circuit 95) acquires gradation information gb (gb=12) from the organic EL panel 91 (step S30). Accordingly, the bit selection circuit 95 determines that display gradation of the organic EL panel 91 is 12-bit. Subsequently, steps S31 to S35 of the second embodiment described above are performed so that body image data DHD is inputted into the bit selection circuit 95.

(Normal Display Mode)

In a case where the still image file 45 does not include shadow image data DS, such a case where no shadow image data DSD (m) is received, and a case where a notice that there is no shadow image data DS is received from the data reading circuit 60, the bit selection circuit 95 operates in the normal display mode (NO at step S36, and step S70).

Figure 32:
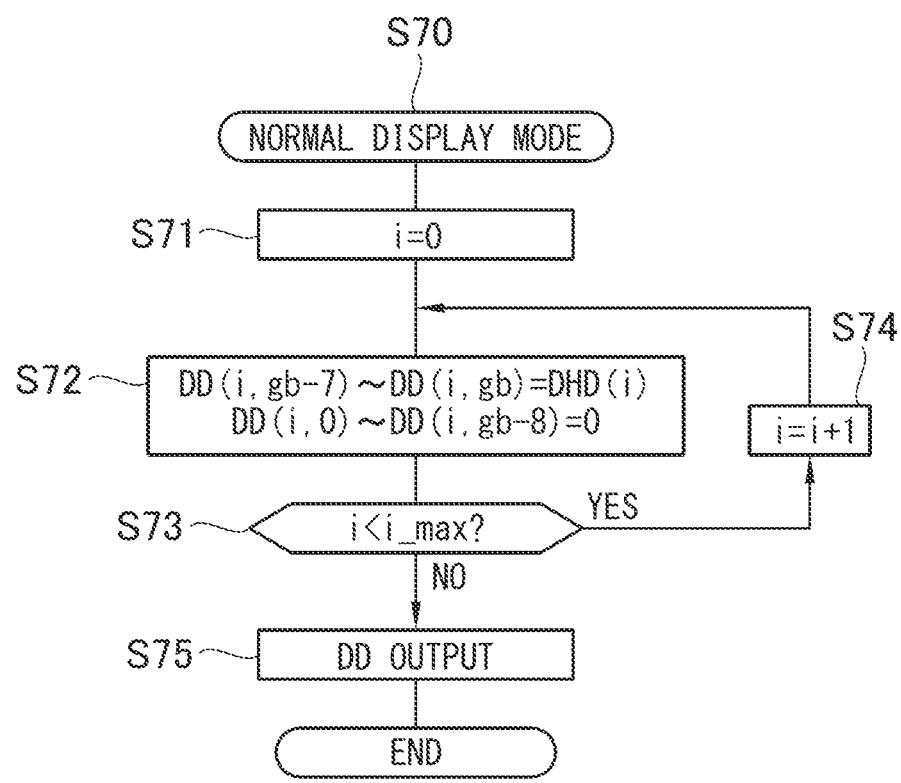
FIG. 32 is a flow chart showing a flow of processing of generating display output data at the time of the normal display mode in the fifth embodiment.

As shown in FIG. 32, the bit selection circuit 95 assigns a pixel value DHD (0) of a 0-th pixel of the body image data DHD to higher-order 8 bits [DD (0,5) to DD (0,12)] of the 0-th pixel of a 12-bit display output data DD. In addition, 0 is inserted to lower-order 4 bits [DD (0,0) to DD (0,4)] of the 0-th pixel of the display output data DD (steps S71 and S72).

Next, the bit selection circuit 95 assigns a pixel value DHD (1) of a first pixel of the body image data DHD to higher-order 8 bits [DD (1,5) to DD (1,12)] of a first pixel of the display output data DD as well as inserts 0 to the lower-order 4 bits [DD (0,0) to DD (0,4)] (YES at step S73, and steps S74 and S72). Likewise, the bit selection circuit 95 repeatedly performs the processing described above for all pixels of the body image data DHD (NO at step S73) to generate the display output data DD, and outputs the display output data DD to the organic EL panel 91 (step S75). Accordingly, an image based on the display output data DD is displayed on a screen of the organic EL panel 91.

(Image Quality Improvement Mode)

With reference to FIG. 31 again, in a case where the still image file 45 includes shadow image data DS, such a case where the shadow image data DSD is received, and a case where a notice that the shadow image data DS is outputted is received from the data reading circuit 60, the bit selection circuit 95 operates in the image quality improvement mode (YES at step S36, and step S77).

Figure 33:
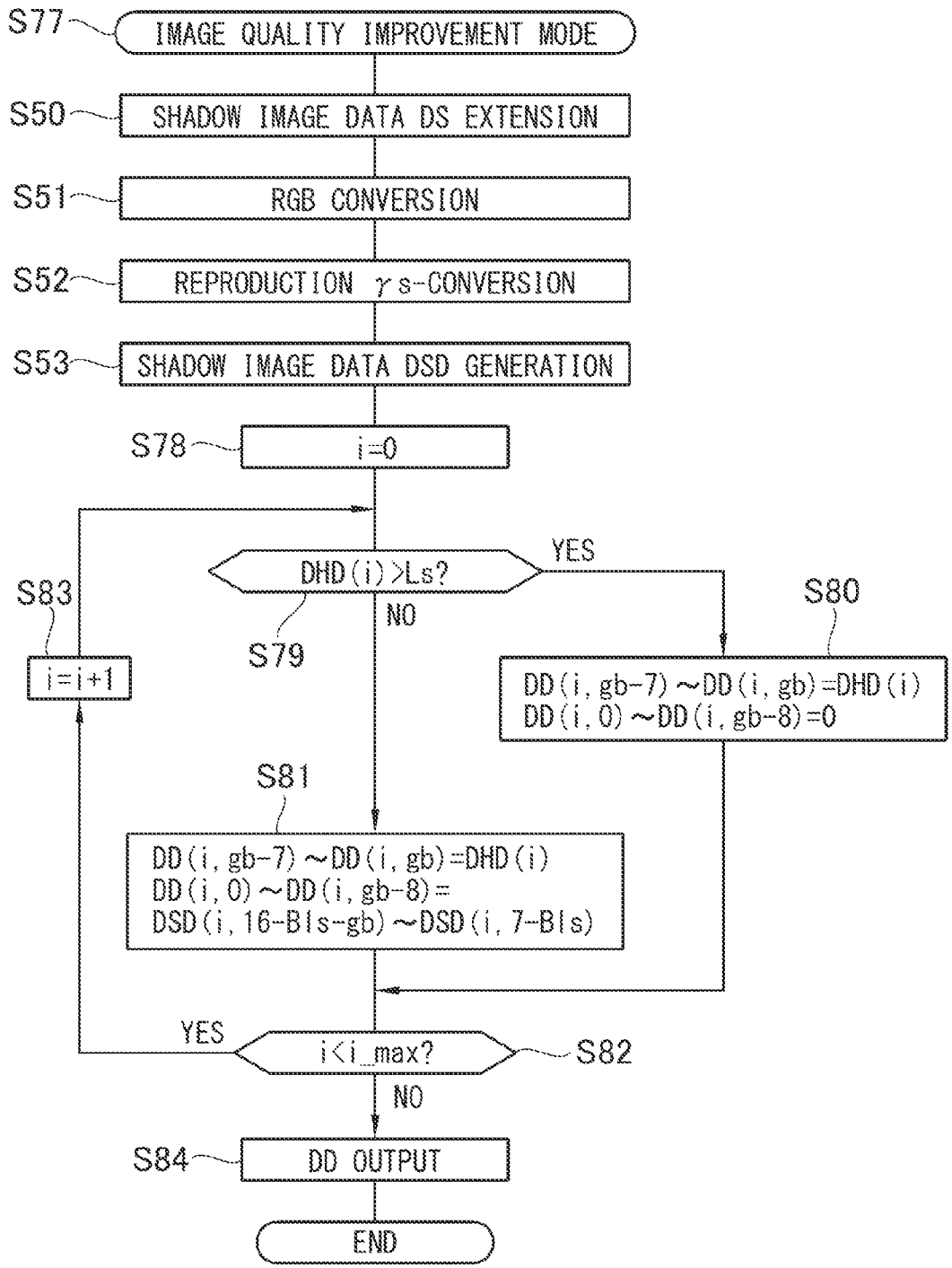
FIG. 33 is a flow chart showing a flow of processing of generating display output data at the time of the image quality improvement mode in the fifth embodiment.

As shown in FIG. 33, in a case where the still image file 45 includes the shadow image data DS, processing of steps S50 to S53 of the second embodiment described above is performed so that the shadow image data DS is inputted into the bit selection circuit 95.

The bit selection circuit 95 determines whether or not a pixel value DHD (0) of a 0-th pixel of body image data DI-ID is equal to or less than a shadow level Ls (steps S78 and S79). If the pixel value DHD (0) is more than the shadow level Ls, the bit selection circuit 95 performs processing as with that during the normal display mode (YES at step S79, step S80).

On the other hand, if the pixel value DHD (0) is equal to or less than the shadow level Ls (NO at step S79), the bit selection circuit 95 assigns the pixel value DHD (0) to higher-order 8 bits [DD (0,5) to DD (0,12)] of a 0-th pixel of display output data DD.

In addition, the bit selection circuit 95 assigns 4 (=gb−8) bits below higher-order 3 bits of a pixel value DSD (0) of shadow image data DSD, specifically from a third bit "5 (=7−Bls)" to a sixth bit "2 (=16−Bls−gb)" in the higher-order, to lower-order 8 bits [DD (0,0) to DD (0,3)] of the 0-th pixel of the display output data DD (step S81).

Next, the bit selection circuit 95 determines whether or not a pixel value DHD (1) of a first pixel of the body image data DHD is equal to or less than the shadow level Ls (YES at step S82, and step S83 and step S79). Then, if the pixel value DHD (1) is more than the shadow level Ls, the bit selection circuit 95 assigns the pixel value DHD (1) to higher-order 8 bits [DD(1,5) to DD(1,12)] of the display output data DD, and assigns bits from a third to a sixth in the higher-order of the pixel value DSD (1) to lower-order 8 bits [DD (1,0) to DD (1,3)] of the display output data DD (step S81).

Likewise, the bit selection circuit 95 repeatedly performs the processing described above for all pixels of the body image data DHD (NO at step S82) to generate the display output data DD, and outputs the display output data DD to the organic EL panel 91 (step S84). Accordingly, an image based on the display output data DD is displayed on a screen of the organic EL panel 91.

With reference to FIG. 31 again, in a case where another still image file 45 recorded in the memory card 10 is reproduced and displayed, each of the processing steps described above is repeatedly performed (step S86) to allow an image based on new display output data DD to be displayed on the screen of the organic EL panel 91.

(Operation Effect of the Fifth Embodiment)

As above, since lower-order bits of 12-bit display output data DD lacked in 8-bit body image data DHD can be compensated from the shadow image data DSD also in the fifth embodiment, it is possible to display shadow portions 37S at sufficient gradation. In addition, it is possible to display the shadow portions 37S at seamless gradation and in high resolution.

Although, in the fifth embodiment described above, there is described a case where 12-bit display output data is generated from 8-bit body image data DHD and 8-bit shadow image data DS, Q-bit display output data corresponding to a display device such as an organic EL panel capable of Q (Q>M)-bit display may be generated from M-bit (M is an arbitrary bit number) body image data DHD and M-bit shadow image data DSD.

(Others)

Figure 34:
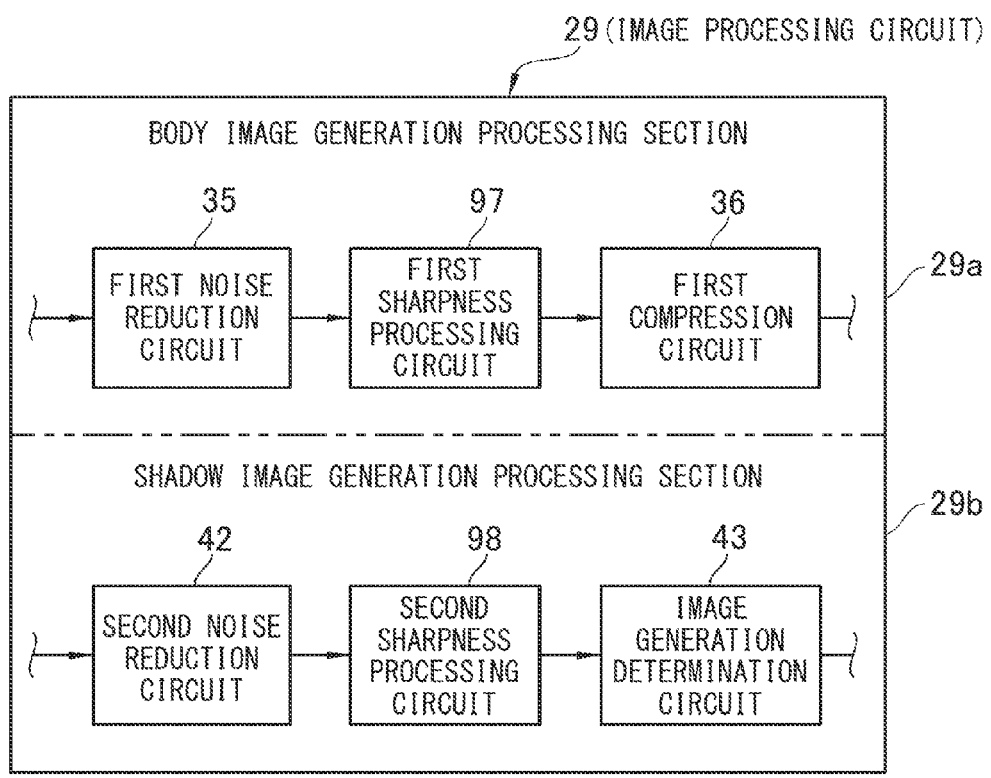
FIG. 34 is a block diagram showing an electrical configuration of an image processing circuit of another embodiment provided with a sharpness processing circuit.

In the digital camera 2 of each of the embodiments above, although the body image generation processing section 29a and the shadow image generation processing section 29b of the image processing circuit 29 serve as the first signal processing and the second signal processing of the present invention, respectively, to perform γ-correction processing, YC conversion processing, noise reduction processing, and compression processing, further sharpness processing may be performed, for example. In this case, as shown in FIG. 34, the body image generation processing section 29a and the shadow image generation processing section 29b may be provided with a first sharpness processing circuit 97 and a second sharpness processing circuit 98, respectively. In addition, characteristics of sharpness processing performed by the first sharpness processing circuit 97 and characteristics of sharpness processing performed by the second sharpness processing circuit 98 may be different.

Figure 35:
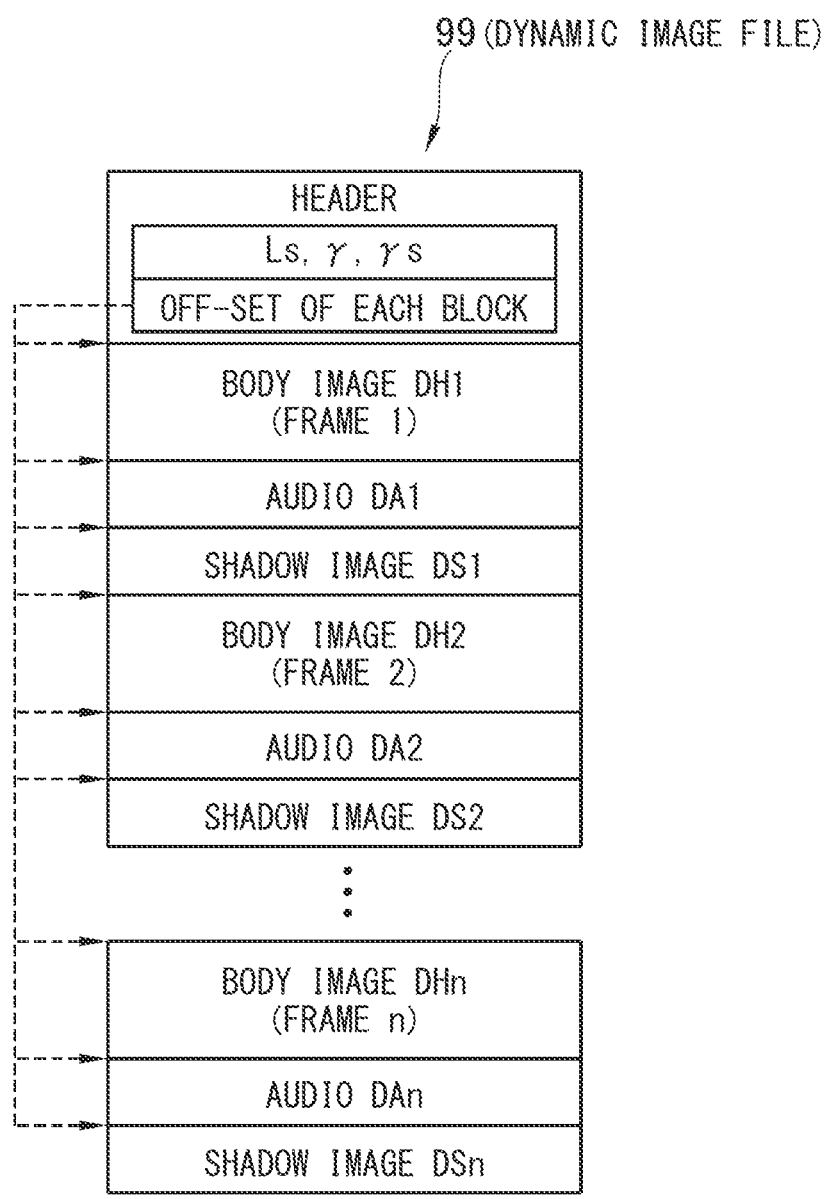
FIG. 35 is an illustration for describing a dynamic image file.

Although, in the digital camera of each of the embodiments described above, a still image file 45 is generated and recorded, a dynamic image file 99 may be generated and recorded as shown in FIG. 35, for example. The dynamic image file 99 is generated and recorded in a motion JPEG format, for example, and alternately records body image data DH, shadow image data DS, and audio (voice) data DA, for each of frames. In addition, the body image data DH and the shadow image data DS are associated with each other for each of the frames.

The dynamic image file 99 has a header that stores shadow level information (Ls), γ, γs, and an off-set address showing each of addresses of the data DH and the data DS. Since processing of generating and recording the dynamic image file 99 is basically identical with the processing of generating and recording the still image file 45, hereinafter a description of the processing is omitted. In a case where at least any one of the Ls, the γ, and the γs is changed in the middle of a frame, information after the change is also stored in the header.

In addition, although the display device of each of the embodiments described above reproduces and displays the still image file 45, the display device can reproduce and display the dynamic image file 99. In this case, processing equivalent to that of reproducing and displaying the still image file 45 described above is applicable for each of frames of the dynamic image file 99, so that a description of the processing of reproducing and displaying the dynamic image file 99 is omitted.

Although the digital camera of each of the embodiments described above generates 8-bit body image data DH and 8-bit shadow image data DS from 14-bit RAW data D, the present invention is applicable to a case where M (M<N)-bit body image data DD and M-bit shadow image data DS are generated from various N-bit (N is an arbitrary bit number) image data.

Although the display device of each of the embodiments described above performs image display with a liquid crystal display device and an organic EL panel, the present invention is applicable to a case where image display is performed with various display device capable of multi-gradation (wide dynamic range) display in which capability of reproducing gradation of a shadow portion is particularly improved, such as a plasma display panel, and a projector, for example. In addition, although a display device (refer to FIG. 2) of a personal computer type is described as an example of the display device of each of the embodiments described above, the present invention is applicable to various display devices capable of displaying an image, such as a television, a monitor, and a portable terminal.

In each of the embodiments described above, although a digital camera is described as an example of an image file generation device of the present invention, the present invention is also applicable to a cellular phone, a smartphone, a personal digital assistant (PDA), and a portable type game machine with a camera function, for example. Hereinafter, a smartphone will be described in detail as an example with reference to drawings.

(Configuration of a Smartphone)

Figure 36:
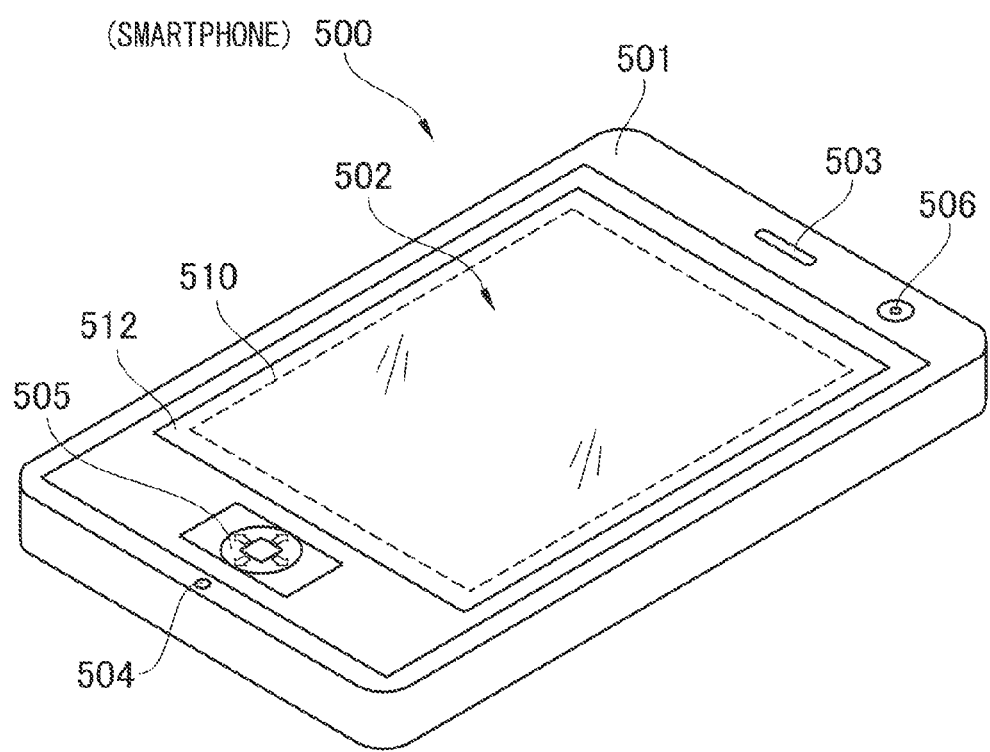
FIG. 36 is a perspective view of an appearance of a smartphone.

FIG. 36 shows an appearance of a smartphone 500. The smartphone 500 includes a tabular body 501 that is provided in its one face with a liquid crystal display device 502, a speaker 503, a microphone 504, an operation section 505, and a camera section 506. The body 501 is not limited to the configuration above, so that there are applicable configurations, such as a configuration in which a display and an input section are separated, a foldable structure, and a configuration with a slide mechanism, for example.

The liquid crystal display device 502 displays an image (still image and dynamic image), character information, and the like by control of a display processing section 508 that receives a command from a CPU 507. In addition, the liquid crystal display device 502 includes so-called touch panel structure of detecting a user operation for displayed information, and is composed of a liquid crystal panel 510, a backlight 511, and an operation panel 512.

The liquid crystal panel 510 and the backlight 511 are basically identical with the liquid crystal panel 52 and the backlight 53 of the second embodiment described above. Thus, the liquid crystal display device 502 is also capable of performing local dimming control.

The operation panel 512 has light permeability, and is mounted on a screen of the liquid crystal panel 510. In addition, the operation panel 512 is a device that detects one or more coordinates operated with a finger of a user or a stylus. When the device is operated with a finger of a user and a stylus, a detection signal caused by the operation is outputted to the CPU of the smartphone 500. The CPU then detects an operation position (coordinate) on the liquid crystal panel 510 on the basis of the received detection signal. Position detection methods to be adopted in the operation panel 512 above include a matrix switch method, a resistive film method, a surface elastic wave method, an infrared ray method, an electromagnetic induction method, a capacitance method, and the like.

Figure 37:
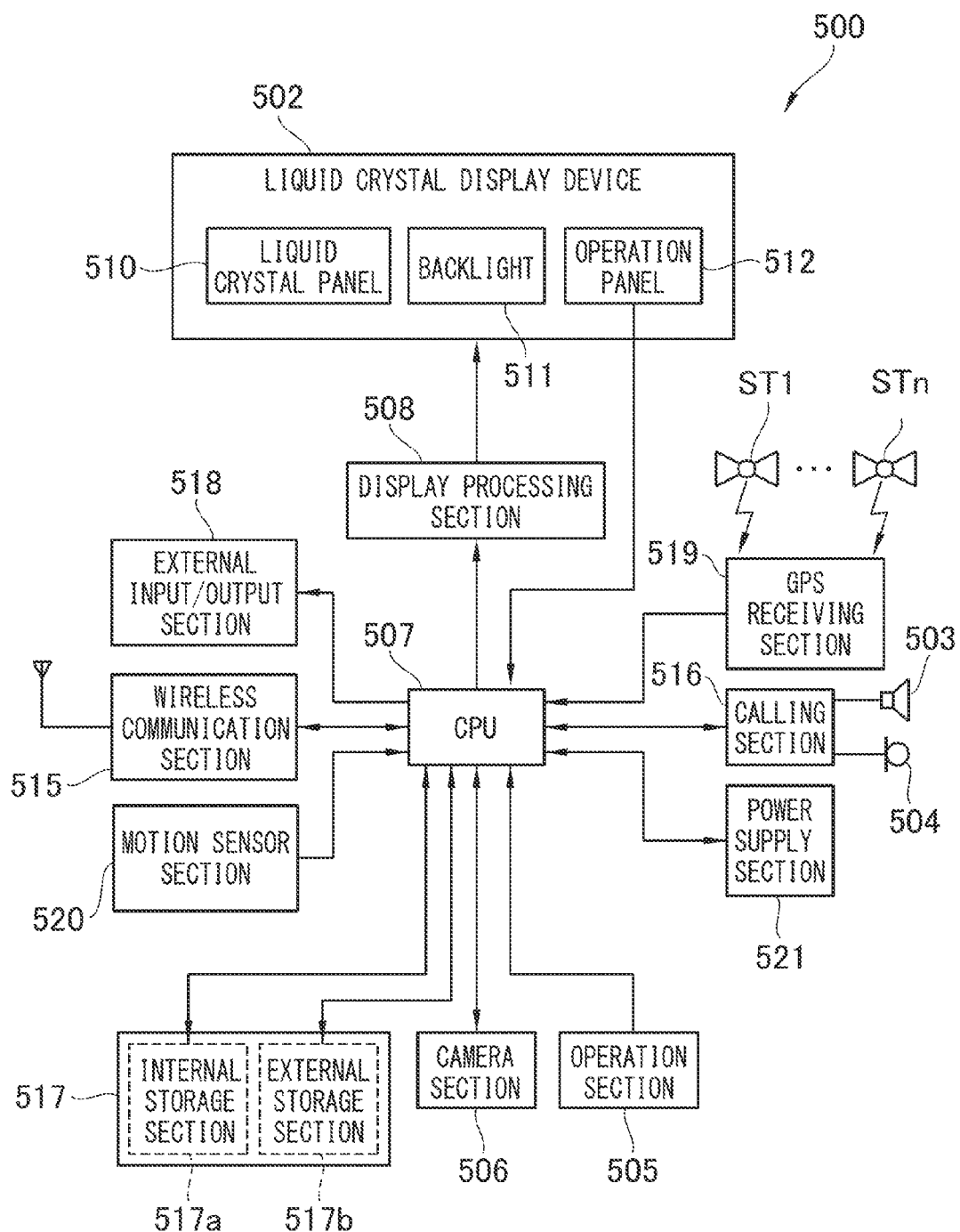
FIG. 37 is a block diagram showing an electrical configuration of the smartphone.

As shown in FIG. 37, the smartphone 500 includes a wireless communication section 515, a calling section 516, a storage section 517, an external input/output section 518, a global positioning system (GPS) receiving section 519, a motion sensor section 520, and a power supply section 521, other than the liquid crystal display device 502, the speaker 503, the microphone 504, the operation section 505, the camera section 506, the CPU 507, and the display processing section 508.

The wireless communication section 515 performs wireless communication with respect to a base station device installed in a mobile communication network in accordance with a command of the CPU 507. The wireless communication is used to transmit and receive various file data items such as voice data and image data, electronic mail data, and the like, and to receive Web data, streaming data, and the like.

The calling section 516 includes the speaker 503 and the microphone 504, and converts a voice of a user received through the microphone 504 into voice data and outputs the voice data to the CPU 507, as well as decodes voice data received by the wireless communication section 515 and the like, and outputs the voice data from the speaker 503. A mounting position of each of the speaker 503 and the microphone 504 is not limited to the position shown in FIG. 1, so that the position can be appropriately changed.

The operation section 505 is a hardware key using a push button type switch, a cross key, or the like, for example, and accepts a command from a user. In addition, the operation section 505 is mounted in a lower portion of a display section of the body 501, or in a side face of the body 501, for example.

The storage unit 517 stores a control program and control data of the CPU 507, an application software, address data in which a name of a communication partner, a telephone number, and the like are associated with each other, data of electronic mails that are transmitted and received, and the like, as well as temporarily stores streaming data and the like. The storage unit 517 is composed of an internal storage section 517a built in the smartphone and a detachable external storage section 517b having an external memory slot. As for the internal storage section 517a and the external storage section 517b, well-known various recording media such as a flash memory type and a hard disk type are used.

The external input/output section 518 serves as an interface with all external devices to be connected to the smartphone 500, and is used to be directly or indirectly connected to another external device by communication and the like.

The GPS receiving section 519 receives GPS signals transmitted from GPS satellites ST1 to STn, and performs positioning calculation processing based on a plurality of the received GPS signals to detect a position of the smartphone 500, defined by a latitude, a longitude, and an altitude. The detection result is outputted to the CPU 507.

The motion sensor section 520 includes a triaxial acceleration sensor and the like, for example, to detect a physical motion of the smartphone 500. Accordingly, moving direction and acceleration of the smartphone 500 are detected. The detection result is outputted to the CPU 507. In addition, the power supply section 521 supplies electric power stored in a battery (not shown) to each of sections of the smartphone 500.

The CPU 507 operates in accordance with a control program and control data read out from the storage section 517 to integrally control each of the sections of the smartphone 500. In addition, the CPU 507 performs display control of the liquid crystal panel 510, and operation detection control of detecting a user operation performed through the operation section 505 or the operation panel 512.

The CPU 507 performs the display control to display a software key such as an icon for starting up application software and a scroll bar, or to display a window for creating an electronic mail. The scroll bar serves as a software key for accepting a command for moving a displaying portion of an image that is too large to fit in a display area of the liquid crystal panel 510, and the like.

In addition, the CPU 507 performs the operation detection control to detect a user operation through the operation section 505, and to accept operation with respect to the icon described above and input of a character string into an input section of the window described above through the operation panel 512, or to accept a request for scrolling a display image through the scroll bar.

Further, the CPU 507 performs the operation detection control to have a touch panel control function of determining whether an operation position with respect to the operation panel 512 is an overlapping portion (display area) overlapped with the liquid crystal panel 510, or an outer periphery (non-display area) other than the overlapping portion, which outer periphery does not overlap with the liquid crystal panel 510, in order to control a sensitive area of the operation panel 512 and a display position of the software key.

The CPU 507 is also capable of detecting a gesture operation with respect to the operation panel 512 to perform a predetermined function in accordance with the detected gesture operation. The gesture operation is not a conventional simple touch operation, but an operation such as drawing a trail with a finger, designating a plurality of positions at the same time, and drawing a trail for at least one of the plurality of positions in combination with both of the operations above.

The camera section 506 corresponds to the digital camera of each of the embodiments described above. Thus, the camera section 506 is capable of generating and recording the still image file 45 and the dynamic image file 99, described above. The still image file 45 and the dynamic image file 99 are stored in the external storage section 517b.

The display processing section 508 corresponds to the image file display device of each of the embodiments described above. Thus, it is possible to display shadow portions 37S at a sufficient gradation by using higher-order bits of shadow image data that is separately recorded. As above, the smartphone 500 is an image file generation and display device including functions of both of the digital camera and the image file display device of each of the embodiments described above. The smartphone 500 may include only any one of the functions of the digital camera and the image file display device of each of the embodiments described above.

Although, in each of the embodiments described above, a photographing apparatus such as a digital camera is described as an example of the image file generation device of the present invention, the present invention is applicable to an image file generation device that acquires RAW data acquired by a digital camera, from a memory card, various communication interfaces, and various communication networks (including the internet) (first image data acquisition device) to generate a still image file 45, and the like.

What is claimed is:
1. An image file generation device comprising:
a first image data acquisition device that acquires N-bit first image data;
a second image data generation device that generates M (M<N)-bit second image data from the first image data acquired by the first image data acquisition device;
a third image data generation device that selects low brightness pixels with a predetermined brightness level from among respective pixels of the first image data acquired by the first image data acquisition device and generates third image data in which the number of gradations of the low brightness pixels are more than the number of gradations assigned to low brightness pixel values in the second image data corresponding to the low brightness pixels in the first image data; and an image file generation device that generates an image file in which the second image data generated by the second image data generation device, the third image data generated by the third image data generation device, and brightness level information on the predetermined brightness level used for generating the third image data are associated with each other, wherein the generated image file comprises the second image data, the third image data, and the brightness level information, the second image data being stored separate from the third image data in the generated image file, wherein the generated image file is recorded on a non-transitory computer readable medium, and wherein the low brightness pixels are lower-order M-bit pixels of the first image data, and the third image data generation device generates the third image data in the M-bit.

2. The image file generation device according to claim 1, wherein the second image data generation device applies first signal processing to the first image data, and the third image data generation device applies second signal processing to the third image data, and wherein each of the first signal processing and the second signal processing includes γ-correction processing, noise reduction processing, sharpness processing, and compression processing, and the first signal processing and the second signal processing are different in characteristics of at least any one of respective processing steps.

3. The image file generation device according to claim 1, wherein the third image data generation device counts a pixel number of the low brightness pixels to generate the third image data if the pixel number is more than a predetermined threshold value.

4. The image file generation device according to claim 1, wherein the first image data acquisition device includes a photographing section that photographs a subject and generates the first image data.

5. The image file generation device according to claim 4, wherein the photographing section has a plurality of types of photographing modes, and includes a photographing mode selection device that selects a photographing mode, and wherein the third image data generation device generates the third image data in a case where a specific photographing mode is selected by the photographing mode selection device.

6. The image file generation device according to claim 4, wherein the photographing section includes setting device that sets a photographing setting value that shows a condition of photographing a subject, and the third image data generation device generates the third image data in a case where the photographing setting value set by the setting device is within a predetermined range.

7. The image file generation device according to claim 1, further comprising:
a pixel value statistic amount calculation device that calculates a statistic amount of a pixel value of each of pixels of the first image data acquired by the first image data acquisition device; and
a brightness level determination device for determining a brightness level at which pixels in a predetermined ratio can be selected as the low brightness pixels, on the basis of the statistic amount calculated by the pixel value statistic amount calculation device, in the first image data, wherein the third image data generation device selects the low brightness pixels on the basis of the brightness level determined by the brightness level determination device.

8. An image file display device comprising:
an image file acquisition device that acquires an image file generated by the image file generation device according to claim 1;
a display device provided with a screen capable of Q (Q>M)-bit gradation display; and
a display control device that outputs display data generated on the basis of the image file acquired by the image file acquisition device to the display device to allow the display device to display a display image on the screen, the display control device generating the display data corresponding to a normal brightness portion where brightness in the display image is more than the brightness level from the second image data, and the display data corresponding to a low brightness portion where brightness in the display image is equal to or less than the brightness level from the third image data.

9. The image file display device according to claim 8, further comprising:
a light emission rate determination device that determines a light emission rate of each of a plurality of illumination sections corresponding to a respective plurality of segments on the basis of the second image data; and
a backlight control device that individually calculates and controls brightness of the plurality of illumination sections on the basis of the second image data and the light emission rate determined by the light emission rate determination device, wherein the display device includes:
a liquid crystal panel;
the plurality of illumination sections that individually illuminate the respective plurality of segments into which a screen of the liquid crystal panel is divided; and
a backlight capable of individually controlling brightness of the plurality of illumination sections, and wherein, in a case where a bit number of the brightness level is B (B is a natural number 1 or more), and brightness of the plurality of illumination sections is controlled so as to be ½P (P is a natural number 0 or more) times maximum brightness, the display control device generates multiplication data by multiplying the third image data by 2P to select a higher-order (B+P) bit of the multiplication data as the display data corresponding to the low brightness portion.

10. The image file display device according to claim 9, wherein the light emission rate determination device acquires a representative value of pixel values of the second image data for each of the respective plurality of segments on the basis of the second image data to determine the light emission rate on the basis of the representative value of each of the respective plurality of segments.

11. An image file display device comprising:
an image file acquisition device that acquires an image file generated by the image file generation device according to claim 1;
a display device provided with a screen capable of Q (Q>M)-bit gradation display;
a gradation information acquisition device that acquires gradation information of the display device; and
a display control device that outputs display data generated on the basis of the image file acquired by the image file acquisition device to the display device to allow the display device to display a display image on the screen, the display control device generating Q-bit display data by using the second image data and (Q−M)-bit equal to or less than a higher-order (B+1)-bit of the third image data, on the basis of the gradation information acquired by the gradation information acquisition device, in a case where a bit number of the brightness level is B (B is a natural number 1 or more).

* * * * *